United States Patent
Furukawa

(10) Patent No.: US 8,009,828 B2
(45) Date of Patent: Aug. 30, 2011

(54) INTEGRATED SHUFFLE VALIDITY PROVING DEVICE, PROOF INTEGRATING DEVICE, INTEGRATED SHUFFLE VALIDITY VERIFYING DEVICE, AND MIX NET SYSTEM

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 933 days.

(21) Appl. No.: 11/915,621

(22) PCT Filed: May 24, 2006

(86) PCT No.: PCT/JP2006/310346
§ 371 (c)(1),
(2), (4) Date: Nov. 27, 2007

(87) PCT Pub. No.: WO2006/126585
PCT Pub. Date: Nov. 30, 2006

(65) Prior Publication Data
US 2009/0080645 A1   Mar. 26, 2009

(30) Foreign Application Priority Data
May 27, 2005   (JP) .................................. 2005-155306

(51) Int. Cl.
*H04K 1/00* (2006.01)
*H04L 9/00* (2006.01)
*H04L 9/28* (2006.01)
(52) U.S. Cl. .............. 380/28; 380/277; 705/12; 705/57; 705/64
(58) Field of Classification Search .................... 380/28, 380/30, 277; 705/12, 57, 64
See application file for complete search history.

(56) References Cited

U.S. PATENT DOCUMENTS

| | | | | | |
|---|---|---|---|---|---|
| 5,367,573 | A | * | 11/1994 | Quimby | 713/167 |
| 5,682,430 | A | * | 10/1997 | Kilian et al. | 380/30 |
| 6,049,613 | A | * | 4/2000 | Jakobsson | 380/47 |
| 6,092,051 | A | * | 7/2000 | Kilian et al. | 705/12 |
| 6,317,833 | B1 | * | 11/2001 | Jakobsson | 713/181 |
| 6,950,948 | B2 | * | 9/2005 | Neff | 705/12 |
| 7,003,541 | B2 | * | 2/2006 | Furukawa et al. | 708/512 |

(Continued)

FOREIGN PATENT DOCUMENTS
JP            8-263575          10/1996
(Continued)

OTHER PUBLICATIONS

Kun Peng, Colin Boyd, and Ed Dawson, Simple and Efficient Shuffling with Provable Correctness and ZK Privacy, Intl Association for Cryptologic Research, 2005.*

(Continued)

*Primary Examiner* — David Garcia Cervetti
(74) *Attorney, Agent, or Firm* — Young & Thompson

(57) ABSTRACT

An integrated shuffle validity proving device (300) is provided correspondingly to an ordinal number K which is an integer representing an order. The device (300) has a permutation proof commitment unit (310) which, on receiving a commitment public key and a permutation storage commitment containing a permutation proof text made by first to (κ−1)-th integrated shuffle validity proving devices from outside, encrypts a permutation proof commitment created by adding a permutation proof text made by the κ-th integrated shuffle validity proving device to the received permutation storage commitment with the commitment public key and sends the encrypted permutation proof commitment to the outside.

6 Claims, 6 Drawing Sheets

Mix net system 600

U.S. PATENT DOCUMENTS

| | | | |
|---|---|---|---|
| 7,035,404 B2* | 4/2006 | Furukawa | 380/28 |
| 7,099,471 B2* | 8/2006 | Neff | 380/30 |
| 7,240,195 B2* | 7/2007 | Furukawa | 713/156 |
| 7,360,094 B2* | 4/2008 | Neff | 713/179 |
| 7,376,833 B2* | 5/2008 | Sako et al. | 713/168 |
| 7,389,250 B2* | 6/2008 | Neff | 705/12 |
| 7,516,891 B2* | 4/2009 | Chaum | 235/386 |
| 7,672,460 B2* | 3/2010 | Furukawa et al. | 380/281 |
| 7,694,880 B2* | 4/2010 | Mori et al. | 235/386 |
| 2001/0024501 A1* | 9/2001 | Furukawa | 380/28 |
| 2002/0007457 A1* | 1/2002 | Neff | 713/180 |
| 2002/0181702 A1* | 12/2002 | Furukawa | 380/28 |
| 2003/0065692 A1* | 4/2003 | Furukawa et al. | 708/277 |
| 2004/0117630 A1* | 6/2004 | Furukawa | 713/176 |
| 2005/0028009 A1* | 2/2005 | Neff | 713/201 |
| 2005/0269406 A1* | 12/2005 | Neff | 235/386 |
| 2006/0123465 A1* | 6/2006 | Ziegler | 726/2 |
| 2006/0262933 A1* | 11/2006 | Furukawa | 380/281 |
| 2007/0074036 A1* | 3/2007 | Ramzan et al. | 713/176 |
| 2007/0095909 A1* | 5/2007 | Chaum | 235/386 |
| 2007/0156796 A1* | 7/2007 | Furukawa et al. | 708/200 |
| 2007/0189519 A1* | 8/2007 | Neff | 380/30 |
| 2007/0192607 A1* | 8/2007 | Canard et al. | 713/176 |
| 2008/0000969 A1* | 1/2008 | Salomonsen et al. | 235/386 |
| 2008/0141035 A1* | 6/2008 | Furukawa | 713/180 |
| 2008/0144813 A1* | 6/2008 | Furukawa | 380/30 |
| 2008/0172333 A1* | 7/2008 | Neff | 705/50 |
| 2008/0301449 A1* | 12/2008 | Teranishi | 713/176 |
| 2009/0074188 A1* | 3/2009 | Furukawa | 380/277 |
| 2009/0080645 A1* | 3/2009 | Furukawa | 380/28 |
| 2009/0287926 A1* | 11/2009 | Furukawa | 713/168 |
| 2010/0115285 A1* | 5/2010 | Furukawa et al. | 713/181 |

FOREIGN PATENT DOCUMENTS

| | | |
|---|---|---|
| JP | 8-315053 | 11/1996 |
| JP | 11-338346 | 12/1999 |
| JP | 2001-251289 | 9/2001 |
| JP | 2002-344445 | 11/2002 |
| JP | 2004-192029 | 7/2004 |

OTHER PUBLICATIONS

Markus Jakobsson, Ari Juels, and Ronald L. Rivest, Making Mix Nets Robust for Electronic Voting by Randomized Partial Checking, Feb. 1, 2002.*

Sako, et al., "Receipt-Free Mix-Type Voting Scheme—A practical solution to the implementation of a voting booth", Jul. 10, 1995, pp. 1-12.

Furukawa et al., "An Implementation of a University Verifiable Electronic Voting Scheme based on Shuffling", Apr. 17, 2003, pp. 1-15.

Japanese Official Action—2005-155306—Aug. 11, 2010.

* cited by examiner

Fig.1 Related Art (1): proved shuffle

Fig.2 Related Art (2): mix net system 200

INTEGRATED SHUFFLE VALIDITY PROVING DEVICE, PROOF INTEGRATING DEVICE, INTEGRATED SHUFFLE VALIDITY VERIFYING DEVICE, AND MIX NET SYSTEM

TECHNICAL FIELD

The present invention relates to an integrated shuffle validity proving device, a proof integrating device, an integrated shuffle validity verifying device, and a mix net system based on integrated proved shuffle technologies for use in the configuration of an anonymous communication path, and the like.

BACKGROUND ART

Related Art (1)

Descriptions in JP-2001-251289A (hereinafter called "Patent Document 1"), for example, are referred to for a conventional proved shuffle technology. FIG. 1 shows the configuration described in Patent Document 1. In this regard, in drawings used for description, joining arrows mean that all pieces of information from the bases of the arrows are collectively sent to the destination of the arrows. Branched arrows mean that all or part of pieces of information from the bases of the arrows are sent to the destinations of the respective arrows. Also, a re-encrypted shuffle in Patent Document 1 is hereinafter called "shuffle."

In FIG. 1, a cryptogram and public key 100 are input to shuffle step 101 and shuffled. After shuffling, shuffle information 102 which is information for identifying the input cryptogram and shuffle is sent to same conversion proof step 103. Also, shuffle information 102 is sent to permutation proof step 104. Upon receipt of shuffle information 102, same conversion proof step 103 generates and outputs same conversion proof text 105, and simultaneously sends random number 106 used for generating the proof text to permutation proof step 104. Permutation proof step 104 outputs permutation proof text 107. Upon receipt of same conversion proof text 105, permutation proof text 107, a cryptogram and public key 100, and shuffled cryptogram 109, response generation step 108 generates and outputs shuffle proof text 110 by adding a response to same conversion proof text 105, permutation proof text 104, and the cryptogram.

Same conversion proof text 105 proves, in association with the response, that it has knowledge on re-ordering of input texts and has converted contents of the cryptogram which is encryption of input texts. Simultaneously with this, same conversion proof text 105 also proves that when an input cryptogram comprises a plurality of integer elements, each element has undergone a shunt of the same order and corresponding encryption processing. Permutation proof text 107 proves, in association with the response, that the order has been correctly shunted for an input cryptogram.

The shuffle shown in FIG. 1 involves re-ordering input cryptograms and again encrypting them. In order to prove that this processing is valid, the document employs two proving steps, i.e., a same conversion proof step and a permutation proof step. With this division of the object to be proved, the document achieves a higher efficiency of generation of a shuffle proof text.

Related Art (2)

For technology 200 for a mix net using conventional proved shuffle decoding, reference is made, for example, to descriptions in "Kazue Sako, Joe Kilian: Receipt-Free Mix-Type Voting Scheme—A Practical Solution to the Implementation of a Voting Booth. EUROCRYPT 1995: 393-403, Springer."

As shown in FIG. 2, here, proved shuffles by a plurality of mixers (201, 202, 203, 204, 205, 206) are performed in succession to re-order a plurality of input cryptograms 207, and re-encrypt and output them 208. Since each mixer independently re-orders the plurality of cryptograms, how the cryptograms have been re-ordered is unknown as a whole unless it is known how all the mixers re-ordered the cryptograms. In this way, the correspondence of input cryptograms to output cryptograms is unknown unless all the mixers leak information in conspiracy. Such a technology is merely effective when one wishes to conceal the relationship between voters and voted contents in an electronic vote or the like.

However, in this method, the correspondence relationship between the input and output is revealed only if all the mixers conspire with one another. Accordingly, it is important to provide a sufficiently large number of mixers in order to more discourage such a conspiracy.

Related Art (3)

Other than Related Art (2), an example of implementing an electronic vote using a mix net is described in "Jun Furukawa, Hiroshi Miyauchi, Kengo Mori, Satoshi Obana, Kazue Sako: An Implementation of a Universally Verifiable Electronic Voting Scheme based on Shuffling. Financial Cryptography 2002: 16-30, LNCS 2339, Springer." Here, first of all, a center which administrates votes accepts cryptograms which has encrypted therein voted contents from all voters. Next, this center passes a set of all cryptograms to a plurality of mixers in order. Each mixer re-orders the set of cryptograms, and re-crypts and sends back them to the center. A work performed by the center to pass this to a next mixer is repeated with respect to all the mixers. Cryptograms received from the last mixer is decrypted to totalize the voting result.

DISCLOSURE OF THE INVENTION

However, the related art described above has problems described below.

It is given that a scenario where the mix net described in Related Art (2) is configured by performing Related Art (1) by a plurality of mixers in succession. Such a mix net is an effective method for performing an electronic vote. However, when sufficient anonymity is requested for voting in an electronic vote, the number of mixers must be increased, as described above. On the other hand, the validity cannot be confirmed for the vote unless each mixer is confirmed to have correctly behaved. For this reason, it is necessary that persons who monitor the vote verify the behaviors of the mixers, as shown in Related Art (1). A large amount of calculation is required for this verification work. More specifically, when sufficient anonymity is requested for voting, a larger number of mixers are required, and the verification must be performed with respect to each mixer, thus taking an immense time for the verification of the entire mix net.

The present invention has been made to solve the problems, as described above, and it is an object to provide an integrated shuffle validity proving device, a proof integrating device, an integrated shuffle validity verifying device, and a mix net system, in which the amount of calculations required for a verifier is constant irrespective of the number of mixers.

An integrated shuffle validity proving device of the present invention for achieving the above object, is provided in correspondence to an order number κ which is an integer indicating an order of a plurality of the integrated shuffle validity proving devices, forming part of a single shuffle validity proving device in harmony with integrated shuffle validity proving devices whose order number are different from the order number of itself, upon receipt of a mix net input cryptogram, for supplying a mix net output cryptogram which is a result of shuffling the mix net input cryptogram, and for supplying a same conversion knowledge proof commitment and a permutation proof commitment for proving a validity of a shuffle, and subsequently upon receipt of a challenge value for authentication, for supplying a response corresponding to the challenge value, the integrated shuffle validity proving device comprises:

a permutation proof commitment device, on a public key for commitment being applied and upon receipt of a permutation storage commitment including permutation proof texts by the integrated shuffle validity proving devices with the order number from 1 to κ−1 from outside, for adding a permutation proof text generated thereby to the permutation storage commitment to generate a permutation proof commitment, for encrypting the permutation proof commitment with the public key for commitment, and for transmitting encrypted permutation proof commitment outside.

On the other hand, a proof integrating device of the present invention for achieving the above object, upon receipt of a mix net input cryptogram, supplies a mix net output cryptogram which is a result of shuffling the mix net input cryptogram, and supplies a same conversion knowledge proof commitment and a permutation proof commitment for proving a validity of a shuffle by harmonizing with a plurality of integrated shuffle validity proving devices provided in correspondence with an order number κ which is an integer indicating an order, and subsequently upon receipt of a challenge value for authentication, operates as a single shuffle validity proving device for supplying a response corresponding to the challenge value, the proof integrating device comprises:

communicating means with each of the plurality of integrated shuffle validity proving devices which are assigned the order number from 1 to a maximum number which is equal to the number of the plurality of integrated shuffle validity proving devices; and a permutation proof commitment integrating device, upon receipt of a permutation proof commitment including permutation proof texts with the order number from 1 to κ from the integrated shuffle validity proving devices, for transmitting the permutation proof commitment as a permutation storage commitment to an integrated shuffle validity proving device having the order number of κ+1 for requesting a permutation proof text.

Also, an integrated shuffle validity verifying device of the present invention for achieving the above object, has means for communicating to a proof integrating device for proving a validity of a shuffle in harmony with a plurality of integrated shuffle validity proving devices provided in correspondence to an order number κ which is an integer indicating an order, wherein: the integrated shuffle validity verifying device receives a public key for mixing, a public key for commitment, a pseudo-public key, a common reference base, a random number, a mix net input cryptogram, and a mix net output cryptogram, and the integrated shuffle validity verifying device comprises:

a commitment receiving device for receiving an integrated same conversion commitment and an integrated permutation proof commitment for proving a validity of a shuffle from the proof integrating device;

a challenge value generating device for generating a challenge value which is a sequence of random values for transmission to the proof integrating device;

a decrypted integrated permutation proof commitment receiving device, upon receipt of a permutation proof commitment assigned a maximum number which is the number of the plurality of integrated shuffle validity proving devices as the order number, and a challenge value assigned the maximum number, for generating a cryptogram of the integrated permutation proof commitment, and for verifying whether or not a decrypted integrated permutation proof commitment derived from a result of distributed decryption of the cryptogram of the integrated permutation proof commitment is correctly generated by communicating with the proof integrating device;

a response receiving device for receiving an integrated response from the proof integrating device, and for receiving a decrypted integrated permutation proof commitment from the proof integrating device; and a verifying device for supplying a verification result indicating whether or not the mix net output cryptogram is correctly generated from the mix net input cryptogram by using the integrated same conversion commitment, the integrated permutation proof commitment, the challenge value, the integrated response, and the decrypted integrated permutation proof commitment.

Also, a mix net system of the present invention for achieving the above object comprises a plurality of the integrated shuffle validity proving devices of the present invention, the proof integrating device of the present invention, and the integrated shuffle validity verifying device of the present invention.

Further, in the mix net system of the present invention, the proof integrating device may receive the mix net input cryptogram, acquire a mix net output cryptogram through communications with each of the plurality of integrated shuffle validity proving device, transmit the mix net output cryptogram to the integrated shuffle validity proving device, and subsequently integrate commitments for verifying a validity of a shuffle to generate an integrated commitment for transmission to the integrated shuffle validity verifying device, and upon receipt of a challenge value from the integrated shuffle validity verifying device, generate an integrated response corresponding to the challenge value for transmission to the integrated shuffle validity verifying device, generate the decrypted integrated permutation proof commitment from the integrated permutation proof commitment for transmission to the integrated shuffle validity verifying device, and prove a validity of the decrypted integrated permutation proof commitment through a communication made with the integrated shuffle validity verifying device, and the integrated shuffle validity verifying device may generate the challenge value, transmit the challenge value to the proof integrating device, and supply a result which determines whether or not mix net processing has been correctly performed by examining whether or not the mix net output cryptograms is generated by re-ordering the mix net input cryptograms and re-encrypting re-ordered mix net input cryptograms, from data acquired through the communication with the proof integrating device.

In the integrated shuffle validity proving device of the present invention, the integrated shuffle validity proving device adds a permutation proof text of the device itself to a permutation storage commitment received from a device, the order number of which is smaller than its own. Accordingly, the permutation proof text of each integrated shuffle validity proving device is stored in the permutation storage commitment in the order of the order number, thereby integrating information for proving the validity of shuffles of all devices which perform the shuffles. As a result, the entire shuffles can be efficiently verified from the integrated information.

The proof integrating device of the present invention communicates with each of the plurality of integrated shuffle validity proving devices to integrate information on the validity of a shuffle in each device into one, thereby making it possible to regard the entire mix net as a single shuffle in the processing. Also, since the integrated shuffle validity verifying device of the present invention is simply required to receive and verify information on the validity of shuffles from the proof integrating device, no communications of data is needed between a plurality of integrated shuffle validity proving devices, as has been done in the past. Further, the mix net system of the present invention has the effects of these three devices.

Consequently, according to the present invention, when a plurality of mixers verify the validity of the mix net which performs shuffles, the amount of calculations required for a verifier does not depend on the number of mixers, i.e., the number of times the shuffles are performed. Since this can reduce a burden on the verifier, the number of mixers can be readily increased to configure a mix net which has a higher anonymity.

DESCRIPTION OF REFERENCE NUMERALS

Figure 1:
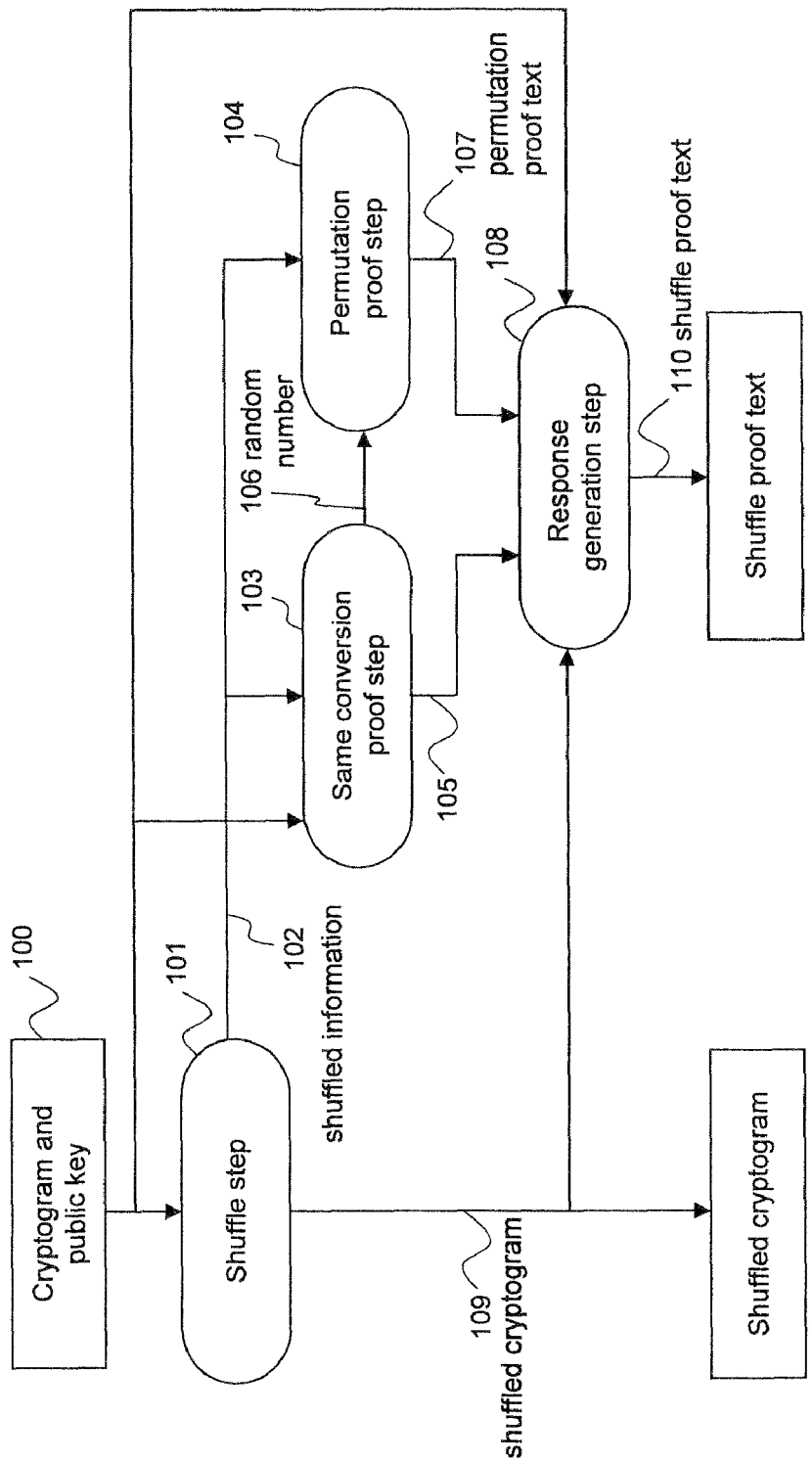
FIG. 1 is a diagram for describing the configuration of Related Art (1).
Figure 2:
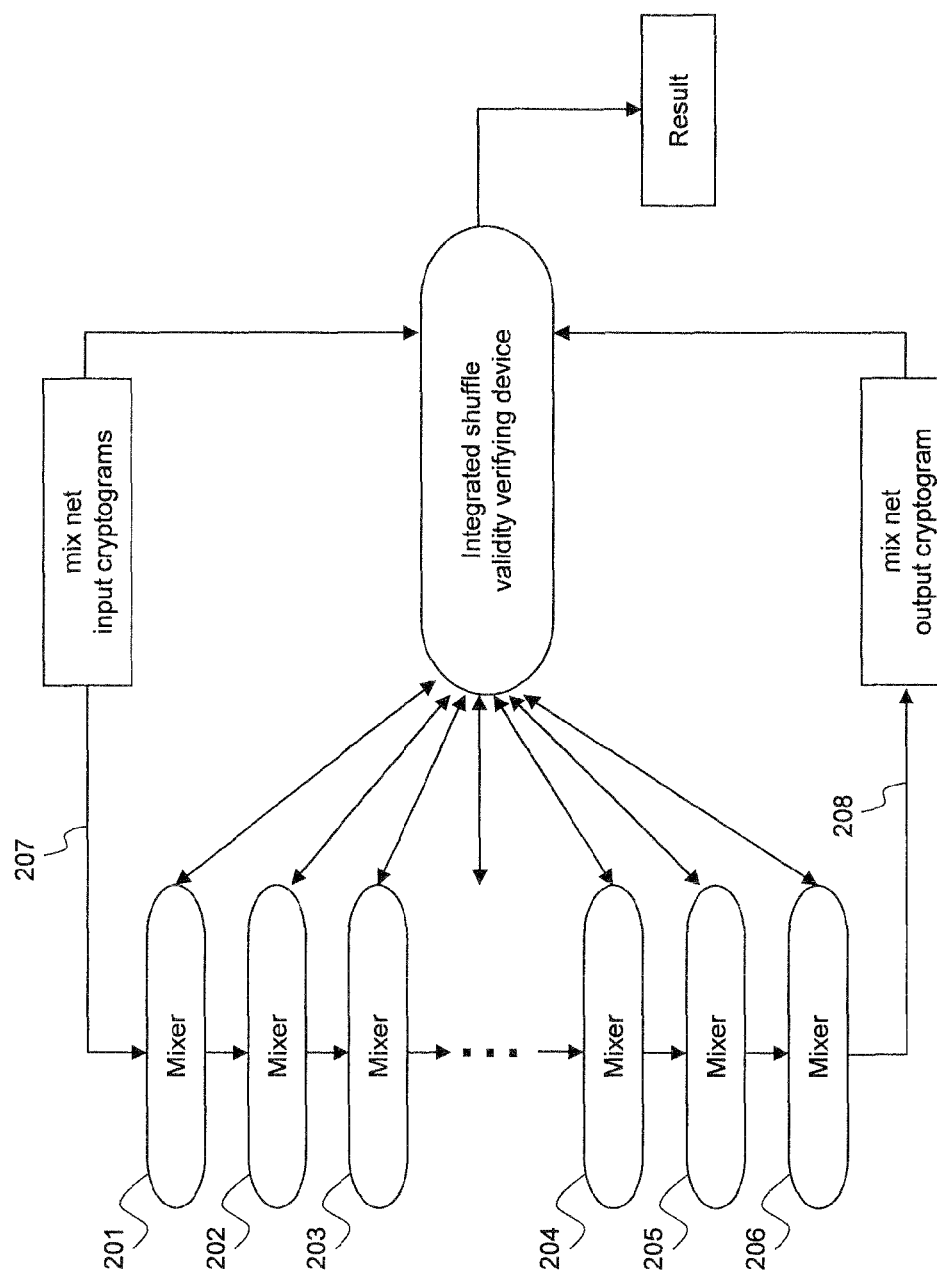
FIG. 2 is a diagram for describing the configuration of Related Art (2).

300 Integrated Shuffle Validity Proving Device
400 Proof Integrating Device
500 Integrated Shuffle Validity Verifying Device
600 Mix Net System

BEST MODE FOR CARRYING OUT THE INVENTION

An embodiment of a mix net system according to the present invention will be described with reference to the drawings. In the following embodiment, a description will be given in context of an example which uses an elliptic ElGamal cipher. Not limited to this example, a difficult cyclic group of a discrete logarithmic problem may be assumed.

First, predicated matters in the present invention will be described in order.

[Symbols]

$M_{k,n}(X)$ represents a matrix of k rows and n columns which form points on E. It is given that X is on space EC of ellipse E, $Z_q$ or an ElGamal cipher. Note that points of EC comprise two points of E, where $M_{k,n}(EC)=M_{k,2n}(E)$.

Now, an (i,j) component of A is labeled $A_{ij}$ when $A \in M_{k,n}(X)$ is established.

Also, when $B \in M_{n,m}(Y)$ is established, AB is a matrix of k rows and m columns, where its (i,j) component is defined to be $(AB)ij = \Sigma_{g=1}^{n} A_{ig} B_{gj}$.

In this definition, a multiplication is defined to be a multiplication on $Z_q$ when both X, Y are on $Z_q$, and to be a scalar multiple of an elliptic curve when X is on $Z_q$ and Y is on E. On the other hand, an addition is defined to be an addition on $Z_q$ when both X, Y are on $Z_q$, and to be an addition of an elliptic curve when X is on $Z_q$ and Y is on E.

It is defined now that $(A \odot B)_{ij} = A_{ij} B_{ij}$ for A, $B \in M_{k,n}$.

[Elliptic ElGaMal Public Key Encryption System]

An elliptic ElGamal encryption system is an encryption system which belongs to a public key encryption system. First, it is assumed that q represents a prime number which presents relationship qmod3=2; E represents an elliptic curve as an order which is q; G represents a generation element of E; and O represents an unit element of E. In other words, an arbitrary point P on E satisfies [q] P=O. Here, [x] G represents a x-multiplied point of G.

The elliptic ElGamal public key encryption system comprises the following three algorithms.

[Key Generation Algorithm]

A random number is applied, secret key x is randomly selected out of elements of $Z_q$, public key M is found by calculating M=[x]G, and secret key x and public key M are output.

[Encryption Algorithm]

Plain text $M \in E$, public key M, and a random number are applied, is randomly selected out of elements of $Z_q$, a cryptogram is calculated by $C=(G_1, M_1)=([s]G, M+[s]M)$, and this is output.

[Decryption Algorithm]

Cryptogram C and secret key x are applied, decrypted text, $M'=M_1-[x] G_1$, is output. Output, M' of the decryption algorithm, matches with encrypted plain text M, is apparent from $M'=M_1-[x] G_1=M+[s] M-[x] [s] G=M+[s] M-[s] M=M$.

[Re-Encryption Algorithm]

Cryptogram $(G_1, M_1)$ is applied, re-encrypted text, $(G'_1, M'_1)=([t]G+G_1, [s]M+M_1)$, is output by using t which is randomly selected out of elements of $Z_q$. Results of decrypting $(G'_1, M'_1)$ and $(G_1, M_1)$ are the same.

[Symbols of Re-Encryption]

$C \in M_{k,1}(EC)$ is given and Y is a public key of an ElGamal encrypted text. In this event, it is assumed that $Y*C \in M_{k,1}(EC)$ and $(Y*C)_{i,1}$ is re-encrypted by using Y for $C_i$.

Also, when $\theta \in M_{k,1}(Z_q)$ is established, it is assumed that $Y*\theta \in M_{k,1}(EC)$ and $(Y*\theta)_i$ is re-encrypted by using Y for $([\theta]G)_i$.

When $C' \in M_{k,1}(EC)$ is established, it is assumed that $C+C' \in M_{k,1}(EC)$ and (C+C'), is encrypted for sum of decrypted texts of $C_i$ and $C'_i$ on E.

[Secret Key Distribution and Distributed Decryption]

When a secret key is y, and public key is Y=[y] G, it is assumed that secret key y is distributively possessed. In other words, $y = \Sigma_{\kappa=1}^{\lambda} y^{(\kappa)}$ mod q is satisfied, and each of $y^{(\kappa)}$ is possessed separately. In this embodiment, this $y^{(\kappa)}$ is called a distributed secret key.

In this event, for completely decrypting cryptogram $(G_1, M_1)$ by public key Y, manipulations of sequentially subtracting $[y^{(\kappa)}]G$ from the value of $M_1$ calculated using the secret key for each decryption are performed with respect to all $\kappa$.

$[y^{(\kappa)}]G_1$ is called the result of distributed decryption by secret key $y^{(\kappa)}$.

[Mix Net System and Mixer]

A mix net system comprises a plurality of mixers. In the present invention, the number of mixers is represented by $\lambda$. M represents a public key of the ElGamal encryption system for use in the mix net system, and this is chosen to be a public key for mixing. A sequence of cryptograms applied to the mix net system comprises a mix net input cryptogram.

[Mixer]

The mixers are numbered from 1 to $\lambda$. A $\kappa$-th mixer is labeled $P^{(\kappa)}$. Also, $\kappa$ is called the order number,

[Mix Net Input Cryptogram]

k cryptograms applied to the mix net are labeled $(G_i, M_i)$, $i=1, \ldots, k$. Each element of the respective cryptogram is an element of E.

$G^{(1)} \in M_{k,1}(E)$ is a column vector (a matrix of k rows and one column), the (i,1) component of which is $G_i$, and $M^{(1)} \in M_{k,1}(E)$ is a column vector (a matrix of k rows and one column), the (i,1) component of which is Mi.

[Mix Net Output Cryptogram]

k decrypted texts supplied from the mix net are labeled $(G'_i, M'_i)$, $i=1, \ldots, k$. Each element of the respective decrypted texts is an element of E.

$G^{(\lambda+1)} \in M_{k,1}(E)$ is a column vector (a matrix of k rows and one columns), the (i,1) component of which is $G'_i$, and $M^{(\lambda+1)} \in M_{k,1}(E)$ is a column vector (a matrix of k rows and one column), the (i,1) component of which is $M'_i$.

They are derived by re-encrypting k cryptograms, $(G_i, M_i)$, $i=1, \ldots, k$, to $([s_i]G+G_i, [s_i]M+M_i)$, $i=1, \ldots, k$, by using $s_i(i=1, \ldots, k)$ which are randomly selected out of elements of $Z_q$ and public key M for mixing, and further re-ordering them. This manipulation is called shuffle.

[Permutation Matrix]

A permutation matrix will be described. The "permutation matrix" is defined to be a square matrix of k rows and k columns which has a unique non-zero component existing on each row and each column, the component value of which is 1 on $Z_q$. A set of such permutation matrixes is represented by $PM_{k,k}(Z_q)$. An inverse matrix of $\phi \kappa PM_{k,k}(Z_q)$ is represented by $\phi^*$.

Examples of $\phi \in PM_{4,4}(Z_q)$ may be:

0,1,0,0
0,0,0,1
0,0,1,0
1,0,0,0

[Input/Output of Each Mixer]

Each mixer is implemented by an integrated shuffle validity proving device.

Next, a mix net system of this embodiment comprises an integrated shuffle validity proving device for shuffling input data; a proof integrating device for integrating a same conversion knowledge proof and a permutation proof by a shuffle; and an integrated shuffle validity verifying device for verifying the validity of the integrated proof. A plurality of the integrated shuffle validity proving device are provided. The number of the integrated shuffle validity proving devices is $\lambda$. The integrated shuffle validity proving devices and the proof integrating device are connected through communication lines, and the proof integrating device and the integrated shuffle validity verifying device are connected through a communication line. In the following, each configuration will be described.

EMBODIMENT 1

An exemplary configuration for an integrated shuffle validity proving device which forms part of a mix net system of the present invention will be described with reference to FIG. 3.

It is assumed that the mix net system in this embodiment comprises $\lambda$ mixers to shuffle k cryptograms.

Integrated shuffle validity proving device 300 comprises a server which includes an input device and an output device including an interface unit for transmitting/receiving data to/from another external device; a storage device for preserving data; and a control device for controlling each component. The control device is provided with a CPU (Central Processing Unit) for executing predetermined processing in accordance with a program, and a memory for storing the program.

Figure 3:
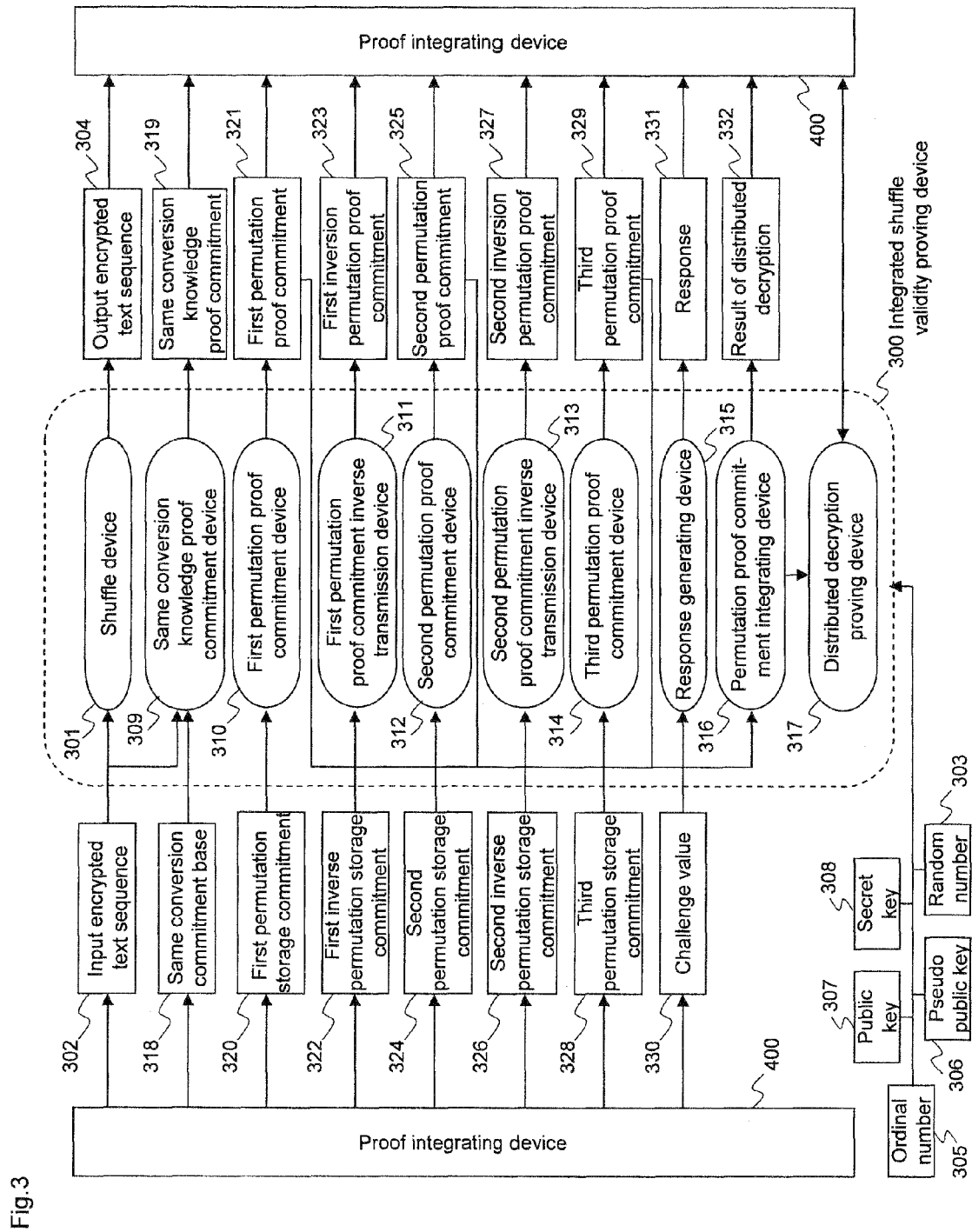
FIG. 3 is a diagram showing the configuration of an integrated shuffle validity proving device according to Embodiment 1 of the present invention.

Shuffle device 301, same conversion knowledge proof commitment device 309, first permutation proof commitment device 310, first permutation proof commitment inverse transmission device 311, second permutation proof commitment device 312, second permutation proof commitment inverse transmission device 313, third permutation proof commitment device 314, response generation device 315, permutation proof commitment integrating device 316, and distributed decryption proving device 317 shown in FIG. 3 are virtually configured within the server by the CPU executing the program.

Integrated shuffle validity proving device 300 is applied with $\kappa$ which serves as order number 305 which is a number indicative of the order of a mixer implemented thereby; number k of cryptograms to be shuffled; a parameter representative of elliptic curve E; and generator $G \in E = M_{1,1}(E)$ of E. Also, F which serves as pseudo-public key 306 by a point randomly selected from E, and $M \in E$ which serves as public key 307a for mixing are applied to integrated shuffle validity proving device 300. These pieces of information are stored in the storage devices, and are available in any of all steps. It is assumed that input cryptograms have been encrypted by public key 307a for mixing.

Also, $y^{(\kappa)} \in Z_q$ represents secret key 308 of integrated shuffle validity proving device 300 which is applied with $\kappa$ which is order number 305. Then, $Y = \Sigma_{\kappa=1}^{\lambda} [y^{(\kappa)}] G \in E = M_{1,1}(E)$ represents public key 307b for commitment. Public key 307 shown in FIG. 3 includes the aforementioned public key 307a for mixing and public key 307b for commitment. Integrated shuffle validity proving device 300 which has been applied with $\kappa$ which is order number 305 is applied with $y^{(\kappa)}$ and Y. Integrated shuffle validity proving device 300 is applied with random number 303. These pieces of information are also stored in the storage device.

In regard to the aforementioned $\kappa$, k, M, f, $y^{(\kappa)}$, Y and random number 303 which are applied to integrated shuffle validity proving device 300, their inputs are not explicitly shown in the figure, but they can be freely read from the storage device at each step. Incidentally, it is assumed that O is infinite point of E, $F'^{(1)} = G'^{(1)} = M'^{(1)} = O$ of E.

[Shuffle Device 301]

As input cryptogram string 302 which is two k-component column vectors, $(G^{(\kappa)} M^{(\kappa)}) \in (M_{k,1}(E), M_{k,1}(E))$, is applied from proof integrating device 400. Next, random permutation matrix, $\phi^{(\kappa)} \in PM_{k,k}(Z_q)$, of k rows and k columns is generated using random number 303. Next, random k-component column vector (a matrix of k rows and 1 column), $\theta^{(\kappa)} \in M_{k,1}(Z_q)$, is generated using random number 303.

Since $\phi^{(\kappa)}$, $\theta^{(\kappa)}$ are uniquely created from input random numbers, they are thought to be previously included in the input random numbers. In other words, in the following device, by using the input random numbers applied to integrated shuffle validity proving device 300, the same data created from the random numbers, such as $\phi$ and $\theta$, can be generated again.

Next, output cryptogram sequence 304 which is two k-component column vectors, $(G^{(\kappa+1)}, M^{(\kappa+1)}) \in (M_{k,1}(E),$ $M_{k,1}(E)$), is generated by $(G^{(\kappa+1)}, M^{(\kappa+1)})=([\phi^{(\kappa)}]G^{(\kappa)}+([\theta^{(\kappa)}]G, [\phi^{(\kappa)}]M^{(\kappa)}+([\theta^{(\kappa)}]M)$. Output cryptogram sequence 304 is created by re-encrypting each cryptogram in input cryptogram sequence 302 and reordering (replacing) them. Integrated shuffle validity proving device 300 supplies $(G^{(\kappa+1)}, M^{(\kappa+1)}) \in (M_{k,1}(E), M_{k,1}(E))$ to proof integrating device 400 as output cryptogram sequence 304.

[Beginning of Description on Devices (309-317) Related to Shuffle Proof]

[Same Conversion Knowledge Proof Commitment Device 309]

As same conversion commitment base 318, $F^{(\kappa)} \in M_{k,1}(E)$, $F'^{(\kappa)} \in E = M_{k,1}(E)$, $G'^{(\kappa)} \in E = M_{k,1}(E)$, and $M'^{(\kappa)} \in E = M_{k,1}(E)$ are applied from proof integrating device 400. Next, random k-component column vector (a matrix of 1 row and k column), $\phi^{(\kappa)} \in E = M_{1,k}(Z_q)$, is generated using random number 303. Next, a random point (a matrix of 1 row and 1 column) on $Z_q$, $\rho^{(\kappa)} \in Z_q = M_{1,1}(Z_q)$, is generated using random number 303.

Next, as concerns $F^{(\kappa+1)} \in M_{k,1}(E)$, $F^{(\kappa+1)}=([\phi^{(\kappa)}]F^{(\kappa)}+[\theta^{(\kappa)}]F)$ is generated.

Next, as concerns $F'^{(\kappa+1)} \in (M_{1,1}(Z_q)$, $G'^{(\kappa+1)} \in E = M_{1,1}(Z_q)$, and $M'^{(\kappa+1)} \in E = M_{1,1}(Z_q)$,
$F'^{(\kappa+1)}=[\phi^{(\kappa)}]F^{(\kappa)}+[\rho^{(\kappa)}]F+F'^{(\kappa)}$,
$G'^{(\kappa+1)}=[\phi^{(\kappa)}]G^{(\kappa)}+[\rho^{(\kappa)}]G+G'^{(\kappa)}$, and
$M'^{(\kappa+1)}=[\phi^{(\kappa)}]M^{(\kappa)}+[\rho^{(\kappa)}]M+M'^{(\kappa)}$ are generated.

Integrated shuffle validity proving device 300 supplies $F^{(\kappa+1)} \in M_{k,1}(E)$, $F'^{(\kappa+1)} \in M_{1,1}(E)$, $G'^{(\kappa+1)} \in M_{1,1}(E)$, and $M'^{(\kappa+1)} \in M_{1,1}(E)$ to proof integrating device 400 as same conversion knowledge proof commitment 319.

[First Permutation Proof Commitment Device 310]

It is assumed that $C_1^{(1)} \in M_{k,1}(EC)$ is a cryptogram by Y for its all components $0 \in Z_q$. As first permutation storage commitment 320, $C_1^{(\kappa)} \in M_{k,1}(EC)$ is applied from proof integrating device 400. Next, $C_1^{(\kappa+1)} \in M_{k,1}(EC)$ is generated by $C_1^{(\kappa+1)}=(\phi^{(\kappa)}\phi^{(\kappa)*})*Y+(C_1^{(\kappa)}[\phi^{(\kappa)*}])*Y$. Integrated shuffle validity proving device 300 supplies $C_1^{(\kappa+1)} \in M_{k,1}(EC)$ to proof verifying device 400 as first permutation proof commitment 321.

[First Permutation Proof Commitment Inverse Transmission Device 311]

$C_2^{(\lambda+1)}=C_1^{(\lambda+1)} \in M_{k,1}(EC)$ is established. As first inverse permutation storage commitment 322, $C_2^{(\lambda+1)} \in M_{k,1}(EC)$ is applied from proof integrating device 400. Next, $C_2^{(\kappa)} \in M_{k,1}(EC)$ is generated by $C_2^{(\kappa)}=C_2^{(\kappa+1)}[(\phi^{(\kappa)}])*Y$. Integrated Shuffle validity proving device 300 supplies $C_2^{(\kappa)} \in M_{k,1}(EC)$ to proof integrating device 400 as first inverse permutation proof commitment 323. Also, this is preserved in the storage device.

[Second Permutation Proof Commitment Device 312]

$C_3^{(1)}=C_2^{(1)} \in M_{k,1}(EC)$ is established. As second permutation storage commitment 324, $C_3^{(\kappa)} \in M_{k,1}(EC)$ is applied from proof integrating device 400. Next, $C_3^{(\kappa+1)} \in M_{k,1}(EC)$ is generated by $C_3^{(\kappa+1)}=(C_2^{(\kappa)} \odot [(\phi^{(\kappa)}])*Y+(C_3^{(\kappa)}[\phi^{(\kappa)}])*Y$. Integrated shuffle validity proving device 300 supplies $C_3^{(\kappa+1)} \in M_{k,1}(EC)$ to proof integrating device 400 as second permutation proof commitment 325.

[Second Permutation Proof Commitment Inverse Transmission Device 313]

$C_4^{(\lambda+1)}=C_3^{(\lambda+1)} \in M_{k,1}(EC)$ is established. As second inverse permutation storage commitment 326, $C_4^{(\kappa+1)} \in M_{k,1}(EC)$ is applied from proof integrating device 326. Next, $C_4^{(\kappa)} \in M_{k,1}(EC)$ is generated by $C_4^{(\kappa)}=(C_4^{(\kappa+1)}[\phi^{(\kappa)}])*Y$. Integrated shuffle validity proving device 300 supplies $C_4^{(\kappa)} \in M_{k,1}(EC)$ to proof integrating device 400 as second inverse permutation proof commitment 327. Also, this is preserved in the storage device.

[Third Permutation Proof Commitment Device 314]

$C_5^{(1)}=C_4^{(1)} \in M_{k,1}(EC)$ is established. As third permutation storage commitment 328, $C_5^{(\kappa)} \in M_{k,1}(EC)$ is applied from proof integrating device 400. Next, $C_5^{(\kappa+1)} \in M_{k,1}(EC)$ is generated by $C_5^{(\kappa+1)}=(C_4^{(\kappa)} \odot [\phi^{(\kappa)}])*Y+(C_5^{(\kappa)}[\phi^{(\kappa)}])*Y$. Integrated shuffle validity proving device 300 supplies $C_5^{(\kappa+1)} \in M_{k,1}(EC)$ to proof integrating device 400 as third permutation proof commitment 329.

The same conversion knowledge proof commitment is comparable to the same conversion proof text, and the permutation proof commitment is comparable to the permutation proof text.

[Response Generating Device 315]

It is assumed that challenge value $r^{(\lambda+1)} \in M_{1,k}(Z_q)$ is randomly selected by integrated shuffle validity verifying device 300. It is assumed that $r'^{(\lambda+1)}=0$ is established. In this regard, a method of generating a challenge value will be described in detail in Embodiment 2 and Embodiment 3. Challenge values 330, $r^{(\kappa+1)} \in M_{1,k}(Z_q)$ and $r'^{(\kappa+1)} \in M_{1,1}(Z_q)=Z_q$, are applied from proof integrating device 400.

Next, as concerns $r^{(\kappa)} \in M_{1,k}(Z_q)$ and $r'^{(\kappa)} \in M_{1,1}(Z_q)=Z_q$, $r^{(\kappa)}=(r^{(\kappa+1)}+\phi^{(\kappa)})+\phi^{(\kappa)}$, and $r'^{(\kappa)}=(r^{(\kappa+1)}\theta^{(\kappa)})+\rho^{(\kappa)}+r'^{(\kappa+1)}$ are generated.

Integrated shuffle validity proving device 300 supplies $r^{(\kappa)} \in M_{1,k}(Z_q)$ and $r'^{(\kappa)} \in M_{1,1}(Z_q)=Z_q$ to proof integrating device 400 as response 331.

[Permutation Proof Commitment Integrating Device 316]

$C_1^{(\lambda+1)} \in M_{k,1}(EC)$ of first permutation proof commitment 321 output by $\lambda$-th integrated shuffle validity proving device 300, $C_2^{(\lambda+1)} \in M_{k,1}(EC)$ of second permutation proof commitment 325, and $C_3^{(\lambda+1)} \in M_{k,1}(EC)$ of third permutation proof commitment 329 are applied. $r^{(\lambda+1)} \in M_{1,k}(Z_q)$ and $r'^{(\lambda+1)} \in M_{1,1}(Z_q)=Z_q$ are applied as challenge values applied to $\lambda$-th integrated shuffle validity proving device 300.

Next, a cryptogram $C_6 \in M_{1,1}(EC)$ of integrated permutation proof commitment, which is a combination of the aforementioned first permutation proof commitment 321, second permutation proof commitment 325, and third permutation proof commitment 329, is generated by $C_6=[r^{(\lambda+1)}]C_1^{(\lambda+1)}+[r^{(\lambda+1)} \odot r^{(\lambda+1)}]C_2^{(\lambda+1)}+[1]C_3^{(\lambda+1)}$. The [1] in the above equation refers to an element of $M_{1,k}(Z_q)$, the components of which are all $1 \in Z_q$. Also, a first component of $C_6$ is labeled $C_{6,1}$, and a second component of $C_6$ is labeled $C_{6,2}$.

Next, the cryptogram of this integrated permutation proof commitment is distributively decrypted using $y^{(\kappa)}$ which is secret key 308 to calculate $C_{6,2}^{(\kappa)} \in E$ by $C_{6,2}^{(\kappa)}=[y^{(\kappa)}]C_{6,2}$, and then result 332 of the distributed decryption is supplied to proof integrating device 400.

[Distributed Decryption Proving Device 317]

$y'^{(\kappa)} \in Z_q$ is randomly selected, generated $C'_{6,2}^{(\kappa)}=[y^{(\kappa)}]C_{6,2}$ is supplied to proof integrating device 400. $s \in Z_q$ is applied from proof integrating device 400 as a challenge value of decryption proof. A response of the decryption proof, $t^{(\kappa)} \in Z_q$, is generated by $t^{(\kappa)}=y^{(\kappa)}s+y'^{(\kappa)}$, and is supplied to proof integrating device 400.

[End of Description on Devices Related to Shuffle Proof]

The integrated shuffle validity proving device of this embodiment adds a permutation proof text of the device itself to a permutation storage commitment received from a device, the order number of which is smaller than its own. Since the permutation proof text of each integrated shuffle validity proving device is stored in the permutation storage commitment in the order of the order number, information for proving the validity of shuffles of all devices which perform the shuffles is collected. As a result, the verification of the entire shuffles can be efficiently performed from the collected information.

EMBODIMENT 2

Figure 4:
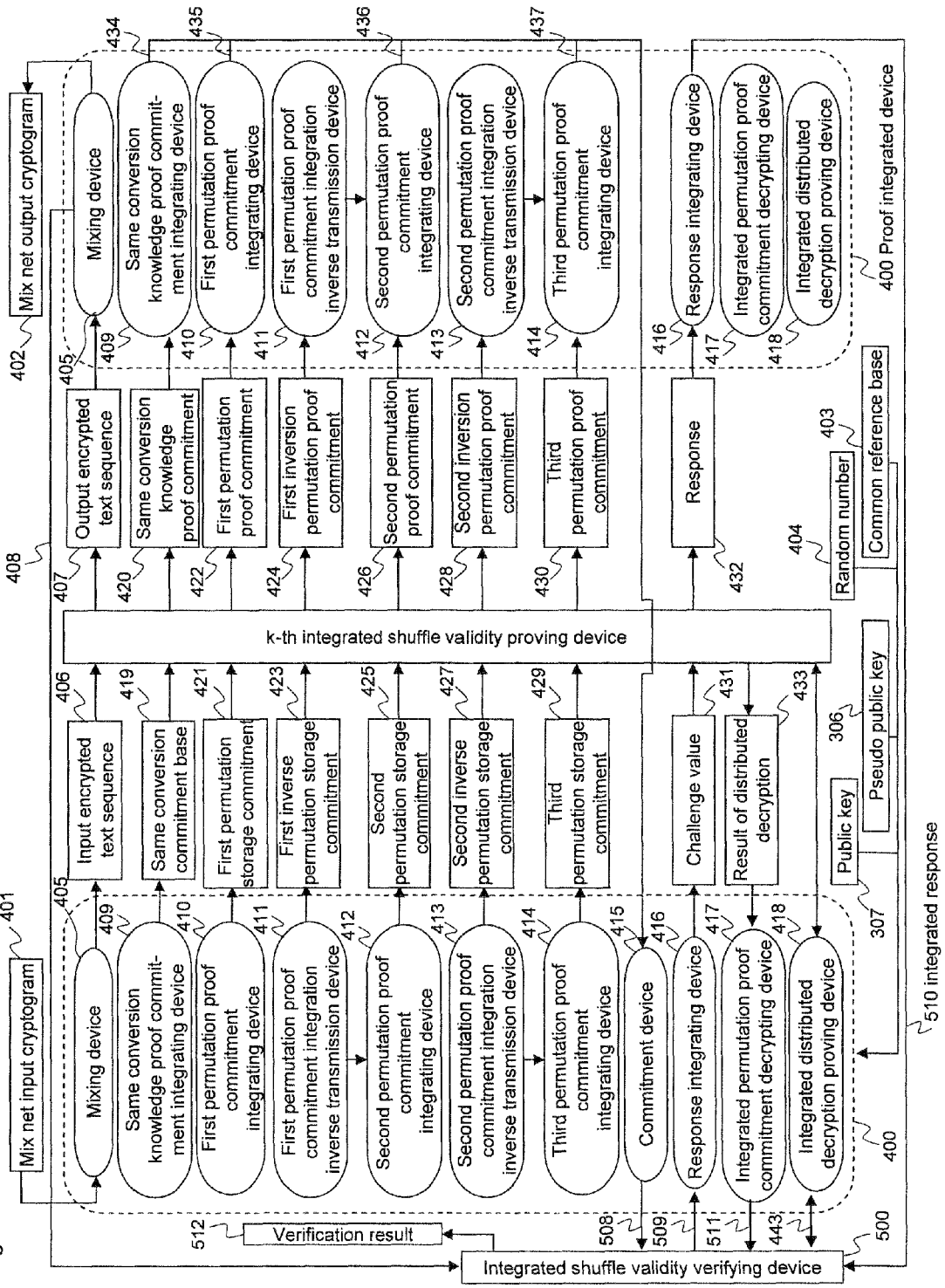
FIG. 4 is a diagram showing the configuration of a proof integrating device according to Embodiment 2 of the present invention.

An exemplary configuration for a proof integrating device which forms part of a mix net system of the present invention will be described with reference to FIG. 4.

Proof integrating device 400 comprises a server which includes an input device and an output device including an interface unit for transmitting/receiving data to/from another external device; a storage device for preserving data; and a control device for controlling each component. The control device is provided with a CPU for executing predetermined processing in accordance with a program, and a memory for storing the program.

Mixing device 405, same conversion knowledge proof commitment integrating device 409, first permutation proof commitment integrating device 410, first permutation proof commitment integration inverse transmission device 411, second permutation proof commitment integrating device 412, second permutation proof commitment integration inverse transmission device 413, third permutation proof commitment integrating device 414, commitment device 415, response integrating device 416, integrated permutation proof commitment decrypting device 417, and integrated distributed decryption proving device 418 are virtually configured in the server by the CPU executing the program.

Proof integrating device 400 is connected to a plurality of integrated shuffle validity proving devices 300 described in Embodiment 1, and integrated shuffle validity verifying device 500 through the interface unit so as to be communicable therewith. The number of integrated shuffle validity proving devices 300 is chosen to be $\lambda$, as is the case with Embodiment 1.

Mix net input cryptogram 401 which comprises a plurality of cryptograms is applied to proof integrating device 400. The number of the cryptograms is indicated by k. Proof integrating device 400 generates mix net output cryptogram 402 which is data derived by re-encrypting re-ordered values of mix net input cryptogram 401 by communicating with $\lambda$ integrated shuffle validity proving device 300, and supplies mix net output cryptogram 402 to integrated shuffle validity verifying device 500.

Further, proof integrating device 400 prepares data required for a proof by communicating with $\lambda$ integrated shuffle validity proving device 300. Then, proof integrating device 400 proves the mix net validity to integrated shuffle validity verifying device 500 by using that data through communications with integrated shuffle validity verifying device 500. In the following, each component will be described in detail.

[Input Device]

A parameter for specifying elliptic curve E, G$\in$E which is a generating element in E, M$\in$E which is public key 307a for mixing, F$\in$E which is pseudo-public key 306, Y$\in$E which is public key 307b for commitment, mix net input cryptogram 401, $(G_i,M_i)$, i=1, . . . , k$\in$(E,E)$^k$, which is encrypted by M of public key 307a for mixing, common reference base 403, $(F_1, \ldots, F_k) \in E\hat{\,}k$, which is randomly selected, and random number 404 are applied to proof integrating device 400. These pieces of information are stored in the storage device.

[Mixing Device 405]

As concerns $(G^{(1)}, M^{(1)})\in(M_{k,1}(E))^2$ which is the first input cryptogram sequence, $G^{(1)}\in M_{k,1}(E)$ is generated as a column vector (a matrix of k row and 1 column), the (i,1) component of which is $G_i$, and M $M_{k,1}(E)$ is generated as a column vector (a matrix of k row and 1 column), the (i,1) component of which is $M_i$. Then, the following procedure is repeated from $\kappa=1$ to $\kappa=\lambda$.

[Start of Repeated Processing]

$(G^{(\kappa)}, M^{(\kappa)})\in(M_{k,1}(E))^2$ is sent to $\kappa$-th integrated shuffle validity proving device 300 as $\kappa$-th input cryptogram sequence 406. $(G^{(\kappa+1)}, M^{(\kappa+1)}) \in(M_{k,1}(E))^2$ is received from $\kappa$-th integrated shuffle validity proving device 300 as $\kappa$-th output cryptogram sequence 407.

If $\kappa=\lambda$ is not satisfied, $(G^{(\lambda+1)}, M^{(\lambda+1)})\in(M_{k,1}(E))^2$ is designated as a (K+1)th input cryptogram sequence.

[End of Repeated Processing]

From $\lambda$-th output cryptogram sequence $(G^{(\lambda+1)}, M^{(\lambda+1)})\in(M_{k,1}(E))^2$, $(G'_i, M'_i)$, i=1, . . . , k$\in$(E,E)$^k$, which is mix net output cryptogram 402 is generated such that $G'_i$ is an i-th component of $G^{(\lambda+1)}$, and $M'_i$ is an i-th component of $M^{(\lambda+1)}$. The proof integrating device outputs mix net output cryptogram 402, and sends output cryptogram 402 to the integrated shuffle validity verifying device (numeral 408).

[Devices 409-418 Related to Proof Integration]

[Same Conversion Knowledge Proof Commitment Integrating Device 409]

$(F^{(1)}\in M_{k,1}(E), F'^{(1)}\in M_{1,1}(E), G'^{(1)}\in M_{1,1}(E), M'^{(1)}\in M_{1,1}(E))$ which is first same conversion commitment base 419 is generated from common reference base 403 in the following manner. $F^{(1)}\in M_{k,1}(E)$ which is a column vector (a matrix of k row and 1 column), the (i,1) component of which is $F_i$, is generated, and $F'^{(1)}=O\in M_{1,1}(E), G'^{(1)}=O\in M_{1,1}(E)$, and $M'^{(1)}=O\in M_{1,1}(E)$ are generated. Then, a procedure shown below is repeated from $\kappa=1$ to $\kappa=\lambda$.

[Start of Repeated Processing]

$\kappa$-th same conversion commitment base 419, $(F^{(\kappa)}\in M_{k,1}(E), F'^{(\kappa)}\in M_{1,1}(E), G'^{(\kappa)}\in M_{1,1}(E), M'^{(\kappa)}\in M_{1,1}(E))$, is sent to $\kappa$-th integrated shuffle validity proving device 300. $\kappa$-th same conversion knowledge proof commitment 420, $(F^{(\kappa+1)}\in M_{k,1}(E), F'^{(\kappa+1)}\in M_{1,1}(E), G'^{(\kappa+1)}\in M_{1,1}(E), M'^{(\kappa+1)}\in M_{1,1}(E))$, is received from $\kappa$-th integrated shuffle validity proving device 300.

If $\kappa=\lambda$ is not satisfied, $(F^{(\kappa+1)}\in M_{k,1}(E), F'^{(\kappa+1)}\in M_{1,1}(E), G'^{(\kappa+1)}\in M_{1,1}(E), M'^{(\kappa+1)}\in M_{1,1}(E))$ is defined as ($\kappa$+1)th same conversion knowledge proof commitment 420.

[End of Repeated Processing]

$(F^{(\kappa+1)}\in M_{k,1}(E), F'^{(\kappa+1)}\in M_{1,1}(E), G'^{(\kappa+1)}\in M_{1,1}(E), M'^{(\kappa+1)}\in M_{1,1}(E))$ of $\lambda$-th same conversion knowledge proof commitment 420 is designated as an integrated same conversion commitment. Same conversion knowledge proof commitment integrating device 409 supplies integrated same conversion commitment 434 to commitment device 415.

[First Permutation Proof Commitment Integrating Device 410]

$C_1^{(1)}\in M_{k,1}(EC)$ which is first of first permutation storage commitment 421 is a cryptogram by Y, all the components of which are $0\in Z_q$. Then, a procedure shown below is repeated from $\kappa=1$ to $\kappa=\lambda$.

[Start of Repeated Processing]

$\kappa$-th first permutation storage commitment 421, $C_1^{(\kappa)}\in M_{k,1}(EC)$, is sent to $\kappa$-th integrated shuffle validity proving device 300. $C_1^{(\kappa+1)}\in M_{k,1}(EC)$ which is $\kappa$-th first permutation proof commitment 422 is received from $\kappa$-th integrated shuffle validity proving device 300.

If $\kappa=\lambda$ is not satisfied, $C_1^{(\kappa+1)}\in M_{k,1}(EC)$ is defined as ($\kappa$+1)th first permutation proof commitment 422.

[End of Repeated Processing]

$C_1^{(\kappa+1)}\in M_{k,1}(EC)$ which is $\lambda$-th first permutation proof commitment 422 is designated as an integrated first permutation proof commitment. First permutation proof commitment integrating device 410 supplies integrated first permutation proof commitment 435 to commitment device 415.

[First Permutation Proof Commitment Integrated Inverse Transmission Device 411]

$\lambda$-th first inverse permutation storage commitment 423 is defined as $C_2^{(\kappa+1)}=C_1^{(\kappa+1)}\epsilon M_{k,1}(EC)$. Then, a procedure shown below is repeated from $\kappa=\lambda$ to $\kappa=1$.

[Start of Repeated Processing]

$\kappa$-th first inverse permutation storage commitment 423, $C_2^{(\kappa+1)}\epsilon M_{k,1}(EC)$, is sent to $\kappa$-th integrated shuffle validity proving device 300. $C_2^{(\kappa)}\epsilon M_{k,1}(EC)$ which is $\kappa$-th first inverse permutation proof commitment 424 is received from $\kappa$-th integrated shuffle validity proof device 300.

If $\kappa=1$ is not satisfied, $C_2^{(\kappa)}\epsilon M_{k,1}(EC)$ is defined as $(\kappa-1)$th first inverse permutation storage commitment 424.

[End of Repeated Processing]

$C_2^{(1)}\epsilon M_{k,1}(EC)$ which is first of first inverse permutation proof commitment 424 is designated as an integrated first inverse permutation proof commitment.

[Second Permutation Proof Commitment Integrating Device 412]

First of second permutation storage commitment 425 is defined as $C_3^{(1)}=C_2^{(1)}\epsilon M_{k,1}(EC)$. Then, a procedure shown below is repeated from $\kappa=1$ to $\kappa=\lambda$.

[Start of Repeated Processing]

$\kappa$-th second permutation storage commitment 425, $C_3^{(\kappa)}\epsilon M_{k,1}(EC)$, is sent to $\kappa$-th integrated shuffle validity proving device 300. $C_3^{(\kappa+1)}\epsilon M_{k,1}(EC)$ which is $\kappa$-th second permutation proof commitment 426 is received from $\kappa$-th integrated shuffle validity proving device 300. If $\kappa=\lambda$ is not satisfied, $C_3^{(\kappa+1)}\epsilon M_{k,1}(EC)$ is defined as $(\kappa+1)$th second permutation proof commitment 426.

[End or Repeated Processing]

$C_3^{(\kappa+1)}\epsilon M_{k,1}(EC)$ which is $\lambda$-th second permutation proof commitment 426 is designated as an integrated second permutation proof commitment. Second permutation proof commitment integrating device 412 supplies integrated second permutation proof commitment 436 to commitment device 415.

[Second Permutation Proof Commitment Integrated Inverse Transmission Device 413]

$\lambda$-th second inverse permutation storage commitment device 427 is defined as $C_4^{(\kappa+1)}=C_3^{(\kappa+1)}\epsilon M_{k,1}(EC)$. Then, a procedure shown below is repeated from $\kappa=\lambda$ to $\kappa=1$.

[Start of Repeated Processing]

$\kappa$-th second inverse permutation storage commitment 427, $C_4^{(\kappa+1)}\epsilon M_{k,1}(EC)$, is sent to $\kappa$-th integrated shuffle validity proving device 300. $C_4^{(\kappa)}\epsilon M_{k,1}(EC)$ which is $\kappa$-th second inverse permutation proof commitment 428 is received from $\kappa$-th integrated shuffle validity proving device 300.

If $\kappa=1$ is not satisfied, $C_4^{(\kappa)}\epsilon M_{k,1}(EC)$ is defined as $(\kappa-1)$th second inverse permutation storage commitment 428.

[End of Repeated Processing]

$C_4^{(1)}\epsilon M_{k,1}(EC)$ which is first of second inverse permutation proof commitment 428 is designated as an integrated second inverse permutation proof commitment.

[Third Permutation Proof Commitment Integrated Device 414]

First of third permutation storage commitment 429 is defined as $C_5^{(1)}=C_4^{(1)}\epsilon M_{k,1}(EC)$. Then, a procedure shown below is repeated from $\kappa=1$ to $\kappa=\lambda$.

[Start of Repeated Processing]

$\kappa$-th third permutation storage commitment 429, $C_5^{(\kappa)}\epsilon M_{k,1}$ (EC), is sent to $\kappa$-th integrated shuffle validity proving device 300. $C_5^{(\kappa+1)}\epsilon M_{k,1}(EC)$ which is $\kappa$-th third permutation proof commitment 430 is received from $\kappa$-th integrated shuffle validity proving device 300. If $\kappa=\lambda$ is not satisfied, $C_5^{(\kappa+1)}\epsilon M_{k,1}(EC)$ is defined as $(\kappa+1)$th third permutation proof commitment 430.

[End of Repeated Processing]

$C_5^{(\kappa+1)}\epsilon M_{k,1}(EC)$ which is $\lambda$-th third permutation proof commitment 430 is designated as an integrated third permutation proof commitment. Third permutation proof commitment integrating device 414 supplies integrated third permutation proof commitment 437 to commitment device 415.

[Commitment Device 415]

Proof integrating device 400 integrates integrated same conversion commitment 434, integrated first permutation proof commitment 435, integrated second permutation proof commitment 436, and integrated third permutation proof commitment 437 to generate integrated commitment 508, and transmits integrated commitment 508 to integrated shuffle validity verifying device 500.

[Response Integrating Device 416]

Integrated challenge value 509, $c^{(\lambda+1)}\epsilon M_{1,k}(Z_q)$, is applied from integrated shuffle validity verifying device 500. $\lambda$-th challenge values 431 which is defined as $(r^{(\lambda+1)}, r'^{(\lambda+1)})\epsilon M_{1,K}(Z_q), M_{1,1}(Z_q))$ is generated in the following manner using integrated challenge value 509. It is satisfied that $r^{(\lambda+1)}=c^{(\lambda+1)}$, $r'^{(\lambda+1)}=0$. A procedure shown below is repeated from $\kappa=\lambda$ to $\kappa=1$.

[Start of Repeated Processing]

$\kappa$-th challenge values 431 which are $r^{(\kappa+1)}\epsilon M_{1,K}(Z_q)$ and $r'^{(\kappa+1)}\epsilon M_{1,1}(Z_q)=Z_q$ are sent to $\kappa$-th integrated shuffle validity proving device 300. $r^{(\kappa)}\epsilon M_{1,K}(Z_q)$ and $r'^{(\kappa+1)}\epsilon M_{1,1}(Z_q)=Z_q$ which are $\kappa$-th response 432 are received from $\kappa$-th integrated shuffle validity proving device 300.

If $\kappa=1$ is not satisfied, $r^{(\kappa)}\epsilon M_{1,K}(Z_q)$ and $r'^{(\kappa)}\epsilon M_{1,1}(Z_q)=Z_q$ are chosen to be $(\kappa-1)$th challenge values 431.

[End of Repeated Processing]

$r^{(1)}\epsilon M_{1,K}(Z_q)$ and $r'^{(1)}\epsilon M_{1,1}(Z_q)=Z_q$ which are first response 432 are designated as integrated response 510. Response integrating device 416 transmits integrated response 510 to integrated shuffle validity verifying device 500.

[Integrated Permutation Proof Commitment Decrypting Device 417]

Cryptogram of the integrated permutation proof commitment, $C_6=[r^{(\lambda+1)}]C_1^{(\lambda+1)}+[r^{(\lambda+1)}\odot r'^{(\lambda+1)}]C_2^{(\lambda+1)}+[1]\,C_3^{(\lambda+1)}$, is generated. Here, a first component of $C_6$ is labeled $C_{6,1}$, and a second component of $C_6$ is labeled $C_{6,2}$. Through communications with integrated shuffle validity proving devices 300 from $\kappa=1$ to $\kappa=\lambda$, $C_{6,2}^{(\kappa)}\epsilon E$ is derived as result 433 of distributed decryption of $C_6$ corresponding to respective $\kappa$. They are combined to generate $H\epsilon E$ as $H=C_{6,1}-\Sigma_{\kappa=1}^{\lambda}C_{6,2}^{(\kappa)}$. Integrated permutation proof commitment decrypting device 417 transmits this H to integrated shuffle validity verifying device 500 as decrypted integrated permutation proof commitment 511.

[Integrated Distributed Decryption Proving Device 418]

Integrated distributed decryption proving device 418 proves for integrated shuffle validity verifying device 500 that the aforementioned H is a decrypted text of a cryptogram of a valid integrated permutation proof commitment by communicating with integrated shuffle validity proving device 300 from $\kappa=1$ to $\kappa=\lambda$ (numeral 442) and communicating with integrated shuffle validity verifying device 500 (numeral 443) in the following manner.

$C'_{6,2}{}^{(\kappa)}\epsilon Z_q$ is received from each integrated shuffle validity proving device through communications with integrated shuffle validity proving device 300 from $\kappa=1$ to $\kappa=\lambda$. In continuation, $C'_{6,2}=\Sigma_{\kappa=1}^{\lambda}C'_{6,2}{}^{(\kappa)}$ which is a commitment of a proof of distributed decryption is generated, and it is transmitted to integrated shuffle validity verifying device 500. Also, upon receipt of $s\epsilon Z_q$ which is a challenge value of the decryption proof from integrated shuffle validity verifying device 500, it is transmitted to integrated shuffle validity proving device 300 from κ=1 to κ=λ. In continuation, $t^{(\kappa)} \in Z_q$ which is a response of the decryption proof is received from each integrated shuffle validity proving device 300 through communications with integrated shuffle validity proving device 300 from κ=1 to κ=λ. Then, $t = \Sigma_{\kappa=1}^{\lambda} t^{(\kappa)}$ which is an integrated response of the decryption proof is generated, and it is transmitted to integrated shuffle validity verifying device 500.

The proof integrating device of this embodiment communicates with respective ones of a plurality of integrated shuffle validity proving devices to integrate information on the validity of a shuffle in each device into one, thereby making it possible to process the entire mix net which is regarded as a single shuffle.

EMBODIMENT 3

An exemplary configuration for an integrated shuffle validity verifying device which forms part of a mix net system of the present invention will be described with reference to FIG. 5.

Integrated shuffle validity verifying device 500 comprises a server which includes an input device and an output device including an interface unit for transmitting/receiving data to/from another external device; a storage device for preserving data; and a control device for controlling each component. The control device is provided with a CPU for executing predetermined processing in accordance with a program, and a memory for storing the program.

Figure 5:
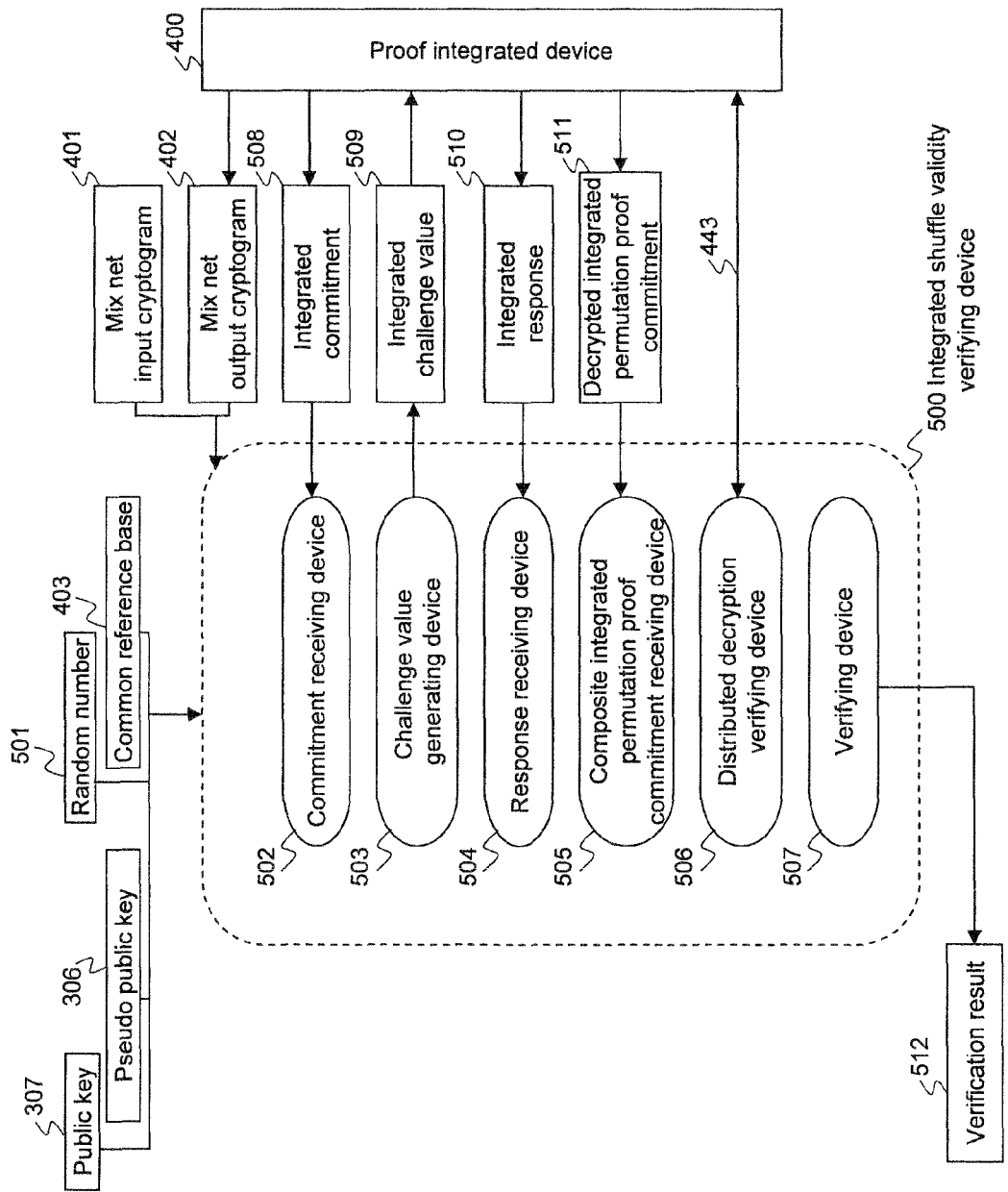
FIG. 5 is a diagram showing the configuration of an integrated shuffle validity proving device according to Embodiment 3 of the present invention.

Commitment receiving device 502, challenge value generating device 503, response receiving device 504, composite integrated permutation proof commitment receiving device 505, distributed decryption verifying device 506, and verifying device 507 shown in FIG. 5 are virtually implemented in the server by the CPU executing the program. Also, integrated shuffle validity verifying device 500 is connected with proof integrating device 400 so as to be communicable therewith through the interface unit in a manner similar to Embodiment 2. In the following, each component will be described in detail.

[Input Device]

A parameter for specifying elliptic curve E, G∈E which is a generating element in E, M∈E which is public key 307a for mixing, F∈E which is pseudo-public key 306, and Y∈E which is public key 307b for commitment are applied. Also, $(G_i, M_i)$, i=1, ..., k∈$(E,E)^k$ which is mix net input cryptogram 401 encrypted by M of public key 307a for mixing, $(G'_i, M'_i)$, i=1, ..., k∈$(E,E)^k$ which is mix net output cryptogram 402, $(F_1, \ldots, F_k) \in E^{\hat{}}k$ which is common reference base 403, and random number 501, are applied. These pieces of information are stored in the storage device.

[Commitment Receiving Device 502]

Integrated commitment 508 including $(F^{(\kappa+1)} \in M_{k,1}(E)$, $F'^{(\kappa+1)} \in M_{1,1}(E)$, $G'^{(\kappa+1)} \in M_{1,1}(E)$, $M'^{(\kappa+1)} \in M_{1,1}(E))$ which is integrated same conversion commitment, $C^{(\kappa+1)} \in M_{k,1}(EC)$ which is integrated first permutation proof commitment, $C_3^{(\kappa+1)} \in M_{k,1}(EC)$ which is integrated second permutation proof commitment, and $C_5^{(\kappa+1)} \in M_{k,1}(EC)$ which is integrated third permutation proof commitment, is received from proof integrating device 400.

[Challenge Value Generating Device 503]

$c^{(\lambda+1)} \in M_{1,k}(Z_q)$ which is randomly generated as integrated challenge value 509, and it is transmitted to proof integrating device 400.

[Response Receiving Device 504]

$r^{(1)} \in M_{1,k}(Z_q)$ and $r'^{(1)} \in M_{1,1}(Z_q) = Z_q$ which are integrated response 510 are received from proof integrating device 400.

[Decrypted Integrated Permutation Proof Commitment Receiving Device 505]

H∈E which is decrypted integrated permutation proof commitment 511, is received from proof integrating device 400.

[Distributed Decryption Verifying Device 506]

A decrypted text of a cryptogram of a valid integrated permutation proof commitment is proved by H which is decrypted integrated permutation proof commitment 511 received from proof integrating device 400, by communicating with proof integrating device 400 (numeral 443) in the following manner.

$C'_{6,2} \in E$ which is a commitment of a proof of the distributed decryption, is received from proof integrating device 400. $s \in Z_q$ which is a challenge value of the decryption proof, is randomly generated, and it is transmitted to proof integrating device 400. $t \in Z_q$ which is an integrated response of the decryption proof, is received from proof integrating device 400.

[Verifying Device 507]

Cryptogram, $C_6 = [r^{(\lambda+1)}] C_1^{(\lambda+1)} + [r^{(\lambda+1)} \odot r^{(\lambda+1)}] C_2^{(\lambda+1)} + [1] C_3^{(\lambda+1)}$, is generated. Here, a first component of $C_6$ is labeled $C_{6,1}$, and a second component of $C_6$ is labeled $C_{6,2}$. It is confirmed that the following five equations are established:

$$[r^{(1)}]F + [r'^{(1)}]F^{(1)} = F^{(\lambda+1)} + [c^{(\lambda+1)}]F^{(\lambda+1)},$$

$$[r^{(1)}]G + [r'^{(1)}]G^{(1)} = G^{(\lambda+1)} + [c^{(\lambda+1)}]G^{(\lambda+1)},$$

$$[r^{(1)}]M + [r'^{(1)}]M^{(1)} = M^{(\lambda+1)} + [c^{(\lambda+1)}]M^{(\lambda+1)},$$

$$[t]C_{6,2} = [s](C_{6,1} - H) + C'_{6,2},$$

$$[\Sigma_{i=1}^{k}\{(r_i^{(1)})^3 + (c_i^{(1)})^3\}]G = H.$$

When they are established, it is determined that a mix net output cryptogram is correctly generated from a mix net input cryptogram, and is "valid." On the other hand, when they are not established, it is determined that a mix net output cryptogram is not correctly generated from a mix net input cryptogram, and is "invalid." Then, the determination result is supplied from the output device as verification result 512.

Since the integrated shuffle validity verifying device of this embodiment is only required to receive information related to the validity of a shuffle from the proof integrating device for verification, data need not be communicated among a plurality of integrated shuffle validity proving devices, as has been done in the past.

EMBODIMENT 4

Figure 6:
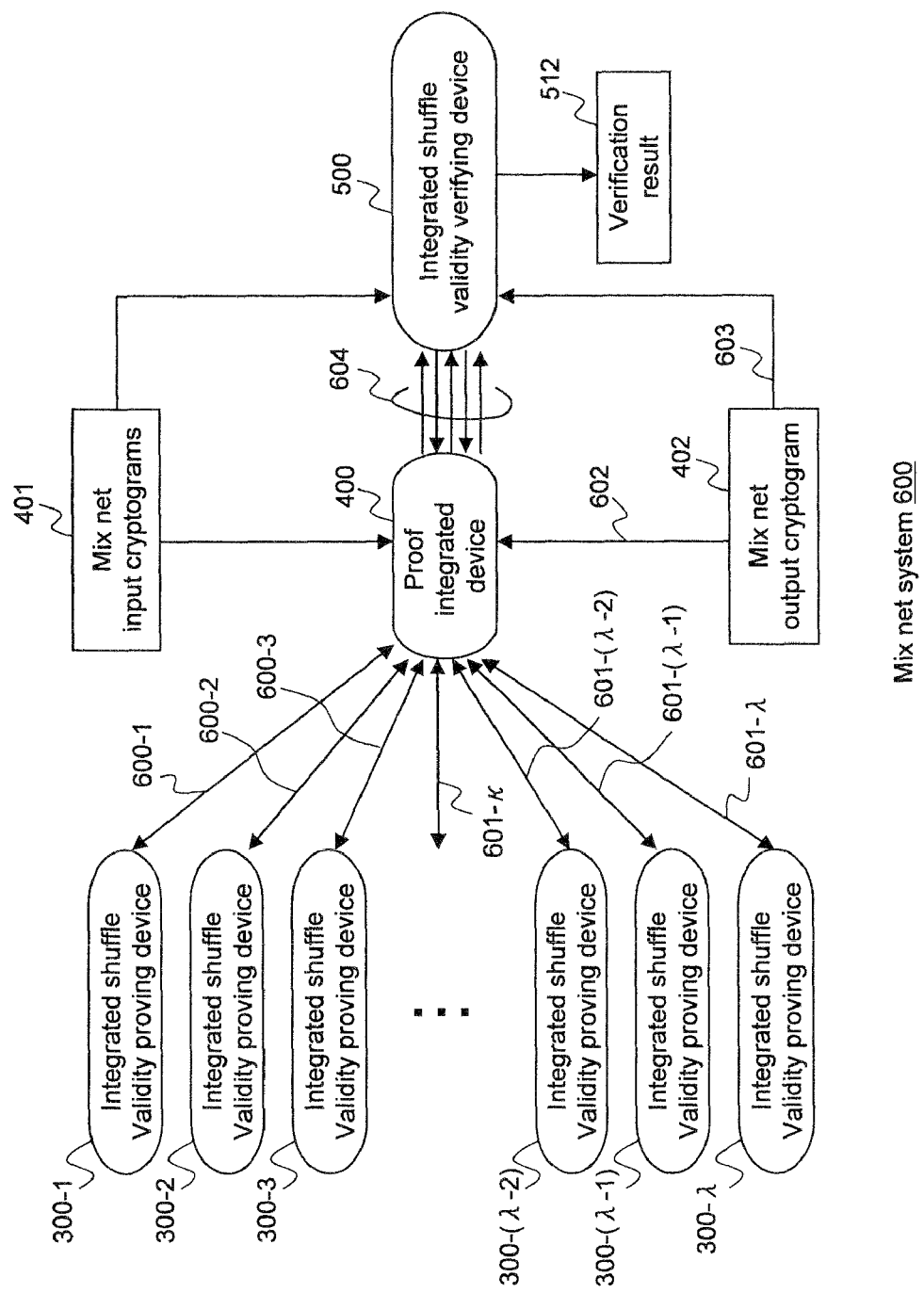
FIG. 6 is a block diagram showing the configuration of a mix net system according to Embodiment 4 of the present invention.

Verifiable mix net system 600 comprised of an integrated shuffle validity proving device, a proof integrating device, and an integrated shuffle validity verifying device, which comprises one embodiment of the present invention, will be described with reference to FIG. 6.

Mix net system 600 comprises integrated shuffle validity proving device 300 described in Embodiment 1; proof integrating device 400 described in Embodiment 2; and integrated shuffle validity verifying device 500 described in Embodiment 3. A plurality of integrated shuffle validity proving devices 300 are provided. Here, the number of the integrated shuffle validity proving devices is indicated by λ, and the integrated shuffle validity proving devices are labeled 300-1-300-λ.

Each integrated shuffle validity proving device 300 and proof integrating device 400 can communicate with each other through the interface units. Also, proof integrating device 400 and integrated shuffle validity verifying device 500 can communicate with each other through the interface units.

To each of integrated shuffle validity proving devices 30-1-300-λ, κ which is order number indicating the order of a mixer implemented thereby; number k of cryptograms to be shuffled; a parameter representative of elliptic curve E; $G\epsilon E=M_{1,1}(E)$ which is generator in E; M which is public key for mixing; $y^{(\kappa)}\epsilon Z_q$ which is secret key corresponding to each integrated shuffle device; Y which is public key for commitment; and a random number, are applied.

To proof integrating device 400, a parameter for specifying elliptic curve E, G∈E which is a generating element in E, M∈E which is public key for mixing, F∈E which is pseudo-public key, Y∈E which is public key for commitment, mix net input cryptogram 401, $(G_i, M_i)$, i=1, . . . , k∈$(E,E)^k$, which is encrypted by public key M for mixing, and $(F_1, \ldots, F_k)\epsilon E\hat{}k$ which is a common reference base, are applied.

To integrated shuffle validity verifying device 500, a parameter for specifying elliptic curve E, G∈E which is a generating element in E, M∈E which is public key for mixing, F∈E which is pseudo-public key, Y∈E which is public key for commitment, mix net input cryptogram, $(G_i, M_i)$, i=1, . . . , k∈$(E,E)^k$, which is encrypted by public key M for mixing, $(G'_i, M'_i)$, i=1, . . . , k∈$(E,E)^k$, which is mix net output cryptogram, $(F_1, \ldots, F_k)\epsilon E\hat{}k$ which is a common reference base, and a random number, are applied.

Proof integrating device 400 generates mix net output cryptogram 402 (numeral 602) through communications with all integrated shuffle validity proving devices 300-1-300-λ (numerals 601-1-601-λ). Then, mix net output cryptogram 402 is transmitted to integrated shuffle validity verifying device 500 (numeral 603). Integrated shuffle validity verifying device 500 receives mix net output cryptogram 402 from proof integrating device 400.

In continuation, proof integrating device 400 generates an integrated commitment through communications with all integrated shuffle validity proving devices 300-1-300-λ (numerals 601-1-601-λ). Then, the integrated commitment is transmitted to integrated shuffle validity verifying device 500. Upon receipt of the integrated commitment from proof integrating device 400, integrated shuffle validity verifying device 500 generates an integrated challenge value which is transmitted to proof integrating device 400.

Upon receipt of the integrated challenge value from integrated shuffle validity verifying device 500, proof integrating device 400 transmits the challenge value to respective ones of integrated shuffle validity proving devices 300-1-300-λ, and receives responses from the respective ones (numerals 601-1-601-λ). Then, upon receipt the responses from integrated shuffle validity proving devices 300-1-300-λ, proof integrating device 400 integrated them to generate an integrated response. In continuation, proof integrating device 400 transmits the integrated response to integrated shuffle validity proving device 500.

Subsequently, proof integrating device 400 generates a decrypted integrated permutation proof commitment through communications with all integrated shuffle validity proving devices 300-1-300-λ(numerals 601-1-601-λ). Then, proof integrating device 400 transmits the decrypted integrated permutation proof commitment to integrated shuffle validity verifying device 500. Integrated shuffle validity verifying device 500 receives the decrypted integrated permutation proof commitment from proof integrating device 400.

Further, proof integrating device 400 proves the validity of the decrypted integrated permutation proof commitment through a communication with integrated shuffle validity verifying device 500 (numeral 604). However, for this proof, proof integrating device 400 communicates with all integrated shuffle validity proving devices 300-1-300-λ.

Integrated shuffle validity verifying device 500 determines from all data acquired through the communication with proof integrating device 400 whether or not the aforementioned mix net output cryptogram 402 was generated by re-ordering the aforementioned mix net input cryptograms 401 and re-encrypting them. In other words, verification result 512 is supplied after determining whether or not mix net processing is correctly performed.

The mix net system of the present invention regards the entire mix net as a single shuffle, and a plurality of mixers cooperatively output a proof of the validity for this single shuffle to a verifier, thereby making it possible to fix the amount of calculation required for the verifier to a constant size irrespective of the number of mixers.

Also, the mix net system of the present invention regards the entire mix net as a single shuffle, and a plurality of mixers cooperatively output a proof of the validity for this single shuffle to a verifier. Accordingly, when the plurality of mixers verify the validity of the mix net which performs a shuffle, the amount of calculations required for the verifier does not depend on the number of mixers, i.e., the number of times the shuffle is performed. As a result, the verifier can be less burdened. Consequently, the number of mixers can be readily increased, producing an effect of configuring a mix net which has a higher anonymity.

This effect is effective when used in an electronic voting system. For example, an electronic voting management center of Related Art (3) manipulates the proof integrating device, and each mixer uses the integrated shuffle validity verifying device. While the integrated shuffle validity verifying device may communicate with individual verifiers to prove the validity of the electronic voting, a proving work can be completely accomplished without communicating with the integrated shuffle validity verifying devices by using an output of a hash function instead of an integrated challenge value output by the integrated shuffle validity verifying device and a challenge value of decryption proof.

In this proving work, data which would be otherwise sent to the verifier, if a communication was made with the verifier for a proof, without using the hash function, is supplied as a proof text of the mix net. Using this proof text of the mix net, anyone can verify the validity of the mix net. Accordingly, the management center can distribute this proof text to a person who wants to verify the validity of the voting, for example, all voters, to verify the validity. The size of the distributed proof text does not depend on the number of mixers which form part of the mix net when the present invention is applied. For this reason, even many voters who possess only small calculation power can readily verify the validity of the electronic voting even if there are a large number of mixers.

Also, it should be understood that the present invention is not limited to the embodiments described above, but a variety of modifications can be made within the scope of the invention, and they are also included in the scope of the invention.

The invention claimed is:

1. An integrated shuffle validity proving device having a central processing unit for executing processing using a program stored within a memory of the central processing unit, provided in correspondence to an order number k which is an integer indicating an order of a plurality of said integrated shuffle validity proving devices, forming part of a single shuffle validity proving device in harmony with integrated shuffle validity proving devices whose order number are different from the order number of itself, upon receipt of a mix net input cryptogram, for supplying a mix net output cryptogram which is a result of shuffling the mix net input cryptogram, and for supplying a same conversion knowledge proof commitment and a permutation proof commitment for proving a validity of a shuffle, and subsequently upon receipt of a challenge value for authentication, for supplying a response corresponding to said challenge value, said integrated shuffle validity proving device comprising:

a permutation proof commitment device, on a public key for commitment being applied and upon receipt of a permutation storage commitment including permutation proof texts by said integrated shuffle validity proving devices with the order number from 1 to κ−1 from outside, for adding a permutation proof text generated thereby to said permutation storage commitment to generate a permutation proof commitment, for encrypting said permutation proof commitment with said public key for commitment, and for transmitting encrypted permutation proof commitment outside, wherein one or a plurality of said permutation proof commitment devices are provided, said integrated shuffle validity proving device comprises:

a shuffling device, upon receipt of an input cryptogram sequence comprised of a plurality of cryptograms and assigned the order number κ, a public key for mixing, and a random number, for shuffling the input cryptogram sequence, and subsequently supplying an output cryptogram sequence comprised of a plurality of cryptograms and assigned the order number κ;

a same conversion knowledge proof commitment device, upon receipt of a same conversion commitment base derived from a common reference base and assigned the order number κ, said input cryptogram sequence assigned the order number κ, and a random number, for generating and supplying a same conversion knowledge proof commitment assigned the order number κ;

a response generating device, upon receipt of a challenge value assigned the order number κ and a random number, for supplying a response assigned the order number κ; and a permutation proof commitment integrating device, upon receipt of said permutation proof commitment assigned the maximum number which is the number of said plurality of integrated shuffle validity proving devices, said challenge value assigned the maximum number, and a distributed secret key assigned the order number κ, for generating a cryptogram of an integrated permutation proof commitment into which said permutation proof commitments are integrated, and for supplying distributed decryption of said cryptogram by said distributed secret key, and said one or plurality of permutation proof commitment device, upon receipt of said public key for commitment, said permutation storage commitment assigned the order number κ, and a random number, generates and supplies said permutation proof commitment comprised of cryptograms by said public key for commitment and assigned the order number κ.

2. The integrated shuffle validity proving device according to claim 1, wherein:

a plurality of said permutation proof commitment devices are provided, said permutation proof commitment device comprising:

a first permutation proof commitment device, upon receipt of said public key for commitment, a first permutation storage commitment assigned the order number κ, and a random number, for generating and supplying a first permutation proof commitment comprised of a cryptogram by said public key for commitment and assigned the order number κ;

a first permutation proof commitment inverse transmission device, upon receipt of said public key for commitment, a first inverse permutation storage commitment assigned the order number κ, and a random number, for generating and supplying a first inverse permutation proof commitment assigned the order number κ;

a second permutation proof commitment device, upon receipt of said public key for commitment, a second permutation storage commitment assigned the order number κ, and a random number, for generating and supplying a second permutation proof commitment comprised of a cryptogram by said public key for commitment and assigned the order number κ;

a second permutation proof commitment inverse transmission device, upon receipt of said public key for commitment, a second inverse permutation storage commitment assigned the order number κ, and a random number, for generating and supplying a second inverse permutation proof commitment assigned the order number κ; and a third permutation proof commitment device, upon receipt of said public key for commitment, a third permutation storage commitment assigned the order number κ, and a random number, for generating and supplying a third permutation proof commitment comprised of a cryptogram by said public key for commitment and assigned the order number κ, and said integrated shuffle validity proving device further comprising a distributed decryption proving device, upon receipt of a random number, for supplying a commitment for proving a validity of distributed decryption by said distributed secret key of said cryptogram of said integrated permutation proof commitment, and upon receipt of a challenge value for proving a validity of said distributed decryption by said distributed secret key of said cryptogram of said integrated permutation proof commitment, for generating and supplying a response for proving a validity of said distributed decryption by said distributed secret key of said cryptogram of said integrated permutation proof commitment from said distributed secret key, said random number, and said challenge value.

3. A proof integrating device having a central processing unit for executing processing using a program stored within a memory of the central processing unit, upon receipt of a mix net input cryptogram, for supplying a mix net output cryptogram which is a result of shuffling said mix net input cryptogram, and for supplying a same conversion knowledge proof commitment and a permutation proof commitment for proving a validity of a shuffle by harmonizing with a plurality of integrated shuffle validity proving devices provided in correspondence with an order number κ which is an integer indicating an order, and subsequently upon receipt of a challenge value for authentication, for operating as a single shuffle validity proving device for supplying a response corresponding to said challenge value, said proof integrating device comprising:

communicating means with each of said plurality of integrated shuffle validity proving devices which are assigned the order number from 1 to a maximum number which is equal to the number of said plurality of integrated shuffle validity proving devices; and a permutation proof commitment integrating device, upon receipt of a permutation proof commitment including permutation proof texts with the order number from 1 to κ from said integrated shuffle validity proving devices, for transmitting said permutation proof commitment as a permutation storage commitment to an integrated shuffle validity proving device having the order number of κ+1 for requesting a permutation proof text, wherein one or a plurality of said permutation proof commitment integrating are provided, said proof integrating device receives a public key for mixing, a public key for commitment, a pseudo-public key, a common reference base, and said mix net input cryptogram comprised of a plurality of cryptograms encrypted by said public key for mixing, said proof integrating device comprises:

communicating means with an integrated shuffle validity verifying device for verifying a validity of a shuffle;

a mixing device for generating an input cryptogram sequence assigned the order number κ from said mix net input cryptograms from 1 to the maximum number with respect to the order number κ of said plurality of integrated shuffle validity proving devices, for transmitting said input cryptogram sequence assigned the order number κ to said integrated shuffle validity proving device assigned the order number κ, and upon receipt of an output cryptogram sequence assigned the order number κ, for performing processing for recasting said output cryptogram sequence into an input cryptogram sequence assigned the order number κ+1, and for generating said mix net output cryptogram from an output cryptogram sequence received from said integrated shuffle validity proving device having the order number equal to the maximum number;

a same conversion knowledge proof commitment integrating device for generating a same conversion commitment base assigned the order number κ from said common reference base from 1 to the maximum number with respect to the order number κ of said plurality of integrated shuffle validity proving devices, for transmitting said same conversion commitment base assigned the order number κ to said integrated shuffle validity proving device assigned the order number κ, and upon receipt of a same conversion knowledge proof commitment assigned the order number κ, for performing processing for recasting said same conversion knowledge proof commitment into a same conversion commitment base assigned the order number κ+1 to generate a same conversion knowledge proof commitment received from said integrated shuffle validity proving device having the order number equal to the maximum number as an integrated same conversion commitment;

a commitment device for transmitting an integrated permutation proof commitment integrated with said permutation proof commitment and said integrated same conversion commitment to said integrated shuffle validity verifying device as an integrated commitment;

a response integrating device, upon receipt of an integrated challenge value integrated with said challenge value from said integrated shuffle validity verifying device, for generating a challenge value assigned a number which is the maximum number plus one from said integrated challenge value, for transmitting a challenge value assigned the order number κ+1 to said integrated shuffle validity proving device assigned the order number κ from the number which the maximum number plus one to 1 with respect to the order number κ of said plurality of integrated shuffle validity proving devices, and upon receipt of a response assigned the order number κ, for performing processing for designating said response as a challenge value assigned the order number κ to generate an integrated response from a response assigned the order number 1; and an integrated permutation proof commitment decrypting device, upon receipt of said permutation proof commitment assigned the maximum number of the order number and said challenge value assigned the maximum number, for generating a cryptogram of an integrated permutation proof commitment integrated with said permutation proof commitment, for communicating with each of said plurality of integrated shuffle validity proving devices, and upon receipt of a distributed decryption result of said cryptogram of said integrated permutation proof commitment by a distributed secret key assigned the order number κ from each integrated shuffle validity proving device, for generating a result of decrypting a cryptogram of a integrated permutation proof commitment from said distributed decryption result, and for transmitting said result of decrypting a cryptogram to a corresponding integrated shuffle validity verifying device, and said one or plurality of permutation proof commitment integrating device generate a permutation storage commitment assigned the order number κ from 1 to the maximum number with respect to the order number κ of said plurality of integrated shuffle validity proving devices, transmit said permutation storage commitment assigned the order number κ to said integrated shuffle validity proving device assigned the order number κ, and upon receipt of a permutation proof commitment assigned the order number κ, perform processing for recasting said permutation proof commitment into a permutation storage commitment assigned the order number κ+1, and generate said integrated permutation proof commitment from a permutation proof commitment received from said integrated shuffle validity proving device having the order number equal to the maximum number.

4. The proof integrating device according to claim 3, wherein:

a plurality of permutation proof commitment integrating devices are provided, said permutation proof commitment integrating device comprising:

a first permutation proof commitment integrating device for generating a first permutation storage commitment assigned the order number κ from 1 to the maximum number with respect to the order number κ of said plurality of integrated shuffle validity proving devices, for transmitting a first permutation storage commitment assigned the order number κ to said integrated shuffle validity proving devices, and upon receipt of a first permutation proof commitment assigned the order number κ, for performing a processing for recasting said first permutation proof commitment into a first permutation storage commitment assigned the order number κ+1 to generate a first permutation proof commitment received from an integrated shuffle validity proving device having the order number equal to the maximum number as an integrated first permutation proof commitment;

a first permutation proof commitment integrated inverse transmission device for transmitting a first inverse permutation storage commitment assigned the order number κ from the maximum number to 1 with respect to the order number κ of said plurality of integrated shuffle validity proving devices, and upon receipt of a first inverse permutation proof commitment assigned the order number κ, for performing processing for recasting said first inverse permutation proof commitment into a first inverse permutation storage commitment assigned the order number κ−1 to generate an integrated first inverse permutation proof commitment from said first inverse permutation proof commitment assigned the order number 1;

a second permutation proof commitment integrating device for generating a second permutation storage commitment assigned the order number κ from 1 to the maximum number with respect to the order number κ of said plurality of integrated shuffle validity proving devices, for transmitting a second permutation storage commitment assigned the order number κ to said integrated shuffle validity proving devices, and upon receipt of a second permutation proof commitment assigned the order number κ, for performing processing for recasting said second permutation proof commitment into a second permutation storage commitment assigned the order number κ+1 to generate said second permutation proof commitment received from an integrated shuffle validity proving device having the order number equal to the maximum number as an integrated second permutation proof commitment;

a second permutation proof commitment integrated inverse transmission device for transmitting a second inverse permutation storage commitment assigned the order number κ from the maximum number to 1 with respect to the order number κ of said plurality of integrated shuffle validity proving devices to said integrated shuffle validity proving device assigned the order number κ, and upon receipt of a second inverse permutation proof commitment assigned the order number κ, for performing processing for recasting said second inverse permutation proof commitment into a second inverse permutation storage commitment assigned the order number κ−1 to generate an integrated second inverse permutation proof commitment from a second inverse permutation proof commitment assigned an order number 1; and a third permutation proof commitment integrating device for generating a third permutation storage commitment assigned the order number κ from 1 to the maximum number with respect to the order number κ of said plurality of integrated shuffle validity proving devices, for transmitting said third permutation storage commitment assigned the order number κ to said integrated shuffle validity proving devices, and upon receipt of a third permutation proof commitment assigned the order number κ, for performing processing for recasting said third permutation proof commitment into a third permutation storage commitment assigned the order number κ+1 to generate said third permutation proof commitment received from said integrated shuffle validity proving device having the order number equal to the maximum number as an integrated third permutation proof commitment, and said proof integrating device further comprises an integrated distributed decryption proving device, upon receipt of a commitment for proving a validity of distributed decryption by said distributed secret key of a cryptogram of said integrated permutation proof commitment from each of said integrated shuffle validity proving devices, for generating a commitment for proving a validity of decryption of said cryptogram of said integrated permutation proof commitment from said received commitment, for transmitting said commitment generated to said integrated shuffle validity verifying device, for transmitting a challenge value for proving a validity of said distributed decryption by said distributed secret key of said cryptogram of said integrated permutation proof commitment to said integrated shuffle validity verifying device, and upon receipt of a response for proving a validity of said distributed decryption by said distributed secret key of said cryptogram of said integrated permutation proof commitment from each of said plurality of integrated shuffle validity proving devices, for generating an integrated response for proving a validity of said decryption of said cryptogram of said integrated permutation proof commitment from said responses received and for transmitting said integrated response to said integrated shuffle validity verifying device.

5. A mix net system, comprising a plurality of integrated shuffle validity proving devices, each having a central processing unit for executing processing using a program stored within a memory of the central processing unit, forming part of a single shuffle validity proving device, provided in correspondence to an order number κ which is an integer indicating an order, upon receipt of a mix net input cryptogram, for supplying a mix net output cryptogram which is a result of shuffling said mix net input cryptogram, and a same conversion knowledge proof commitment and a permutation proof commitment for proving a validity of a shuffle in harmony with integrated shuffle validity proving devices whose order number are different from the order number of itself, subsequently upon receipt of a challenge value for authentication, for supplying a response corresponding to said challenge value, a proof integrating device for operating in harmony with said plurality of integrated shuffle validity proving devices, and an integrated shuffle validity verifying device having means for communicating with said proof integrating device, wherein:

said integrated shuffle validity proving device comprises:
a permutation proof commitment device, on a public key for commitment being applied and upon receipt of a permutation storage commitment including permutation proof texts by said integrated shuffle validity proving devices with the order number from 1 to κ−1 from outside, for adding a permutation proof text generated thereby to said permutation storage commitment to generate a permutation proof commitment, for encrypting said permutation proof commitment with said public key for commitment, and for transmitting encrypted permutation proof commitment outside, said proof integrating device comprises:
communicating means with each of said plurality of integrated shuffle validity proving devices which are assigned the order number from 1 to a maximum number which is equal to the number of said plurality of integrated shuffle validity proving devices; and
a permutation proof commitment integrating device, upon receipt of said permutation proof commitment including permutation proof texts with the order number from 1 to κ from said integrated shuffle validity proving devices, for transmitting said permutation proof commitment as a permutation storage commitment to an integrated shuffle validity proving device having the order number of κ+1 for requesting a permutation proof text, and said integrated shuffle validity verifying device receives a public key for mixing, a public key for commitment, a pseudo-public key, a common reference base, a random number, a mix net input cryptogram, and a mix net output cryptogram, and comprises:

a commitment receiving device for receiving an integrated same conversion commitment and an integrated permutation proof commitment for proving a validity of a shuffle from said proof integrating device;

a challenge value generating device for generating a challenge value which is a sequence of random values for transmission to said proof integrating device;

a decrypted integrated permutation proof commitment receiving device, upon receipt of a permutation proof commitment assigned the maximum number which is the number of said plurality of integrated shuffle validity proving devices as the order number, and a challenge value assigned the maximum number, for generating a cryptogram of said integrated permutation proof commitment, and for verifying whether or not a decrypted integrated permutation proof commitment derived from a result of distributed decryption of said cryptogram of said integrated permutation proof commitment is correctly generated by communicating with said proof integrating device;

a response receiving device for receiving an integrated response from said proof integrating device, and for receiving a decrypted integrated permutation proof commitment from said proof integrating device; and a verifying device for supplying a verification result indicating whether or not said mix net output cryptogram is correctly generated from said mix net input cryptogram by using said integrated same conversion commitment, said integrated permutation proof commitment, said challenge value, said integrated response, and said decrypted integrated permutation proof commitment.

6. The mix net system according to claim 5, wherein:

said proof integrating device receives said mix net input cryptogram, acquires a mix net output cryptogram through communications with each of said plurality of integrated shuffle validity proving device, transmits said mix net output cryptogram to said integrated shuffle validity proving device, and subsequently integrates commitments for verifying a validity of a shuffle to generate an integrated commitment for transmission to said integrated shuffle validity verifying device, and upon receipt of a challenge value from said integrated shuffle validity verifying device, generates an integrated response corresponding to said challenge value for transmission to said integrated shuffle validity verifying device, generates said decrypted integrated permutation proof commitment from said integrated permutation proof commitment for transmission to said integrated shuffle validity verifying device, and proves a validity of said decrypted integrated permutation proof commitment through a communication made with said integrated shuffle validity verifying device, and said integrated shuffle validity verifying device generates said challenge value, transmits said challenge value to said proof integrating device, and supplies a result which determines whether or not mix net processing has been correctly performed by examining whether or not said mix net output cryptograms is generated by re-ordering said mix net input cryptograms and re-encrypting re-ordered mix net input cryptograms, from data acquired through the communication with said proof integrating device.

* * * * *